(12) United States Patent
Arora et al.

(10) Patent No.: US 12,548,245 B2
(45) Date of Patent: Feb. 10, 2026

(54) RENDERING AN ARTIFICIAL REALITY ENVIRONMENT BASED ON A DEFINED HIERARCHY OF MULTIPLE STATES INCLUDING MULTIPLE ARTIFICIAL REALITY EXPERIENCES WITH AUGMENTS

(71) Applicant: Meta Platforms Technologies, LLC, Menlo Park, CA (US)

(72) Inventors: Tushar Arora, Seattle, WA (US); Johnathon Simmons, Seattle, WA (US); Zachary Gil Freeman, Seattle, WA (US); William Joseph Siegfried, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 47 days.

(21) Appl. No.: 18/194,207

(22) Filed: Mar. 31, 2023

(65) Prior Publication Data

US 2024/0331278 A1    Oct. 3, 2024

(51) Int. Cl.
   *G06T 17/00* (2006.01)
   *G06F 3/01* (2006.01)
   *H04N 7/15* (2006.01)

(52) U.S. Cl.
   CPC .............. *G06T 17/00* (2013.01); *G06F 3/012* (2013.01); *G06T 2219/2004* (2013.01); *H04N 7/157* (2013.01)

(58) Field of Classification Search
   None
   See application file for complete search history.

(56) References Cited

U.S. PATENT DOCUMENTS 770,149 A    9/1904  Bailey
6,748,420 B1    6/2004  Quatrano et al.
(Continued)

FOREIGN PATENT DOCUMENTS

CN    112424870 A    2/2021
CN    118732838 A    10/2024
(Continued)

OTHER PUBLICATIONS

Broitman A., "Learn and Do More with Lens in Google Images," Oct. 25, 2018, Retrieved from the Internet: URL: https://www.blog.google/products/search/learn-and-do-more-lens-google-images/ , 4 pages.

(Continued)

*Primary Examiner* — Saptarshi Mazumder
(74) *Attorney, Agent, or Firm* — Morgan, Lewis & Bockius LLP

(57) ABSTRACT

Aspects of the present disclosure are directed to providing an augmented world environment model for an artificial reality (XR) environment. Some implementations of the present technology define how experiences will run on an XR system as a hierarchy of entities, including experiences, augments those experiences create, and an exclusive mode in which a particular experience takes control of the entire view. Some implementations can establish a framework for multiple experiences to interface with each other and to run in an XR ecosystem. This can improve upon traditional mobile and desktop operating systems by providing different states optimized for XR, which can include improved utilization of resources on an XR device, such as an XR head-mounted display. Experiences and augments can enter a particular state based on criteria, and can be, based on the state, processed differently by an operating system or provided with particular capabilities.

18 Claims, 22 Drawing Sheets

(56) References Cited

U.S. PATENT DOCUMENTS

| | | |
|---|---|---|
| 6,842,175 B1 | 1/2005 | Schmalstieg et al. |
| 6,842,877 B2 | 1/2005 | Robarts et al. |
| 7,395,534 B2 | 7/2008 | Alcazar et al. |
| 7,650,575 B2 | 1/2010 | Cummins et al. |
| 7,701,439 B2 | 4/2010 | Hillis et al. |
| 8,335,991 B2 | 12/2012 | Douceur et al. |
| 8,368,640 B2 | 2/2013 | Dardinski et al. |
| 8,558,759 B1 | 10/2013 | Prada Gomez et al. |
| 8,726,233 B1 | 5/2014 | Raghavan |
| 8,930,940 B2 | 1/2015 | Xu et al. |
| 8,947,351 B1 | 2/2015 | Noble |
| 8,947,427 B2 | 2/2015 | Shuster et al. |
| 9,055,404 B2 | 6/2015 | Setlur et al. |
| 9,081,177 B2 | 7/2015 | Wong et al. |
| 9,117,274 B2 | 8/2015 | Liao et al. |
| 9,129,404 B1 | 9/2015 | Wagner |
| 9,292,089 B1 | 3/2016 | Sadek |
| 9,424,239 B2 | 8/2016 | Dunn et al. |
| 9,443,353 B2 | 9/2016 | Vaddadi et al. |
| 9,477,368 B1 | 10/2016 | Filip et al. |
| 9,478,030 B1 | 10/2016 | Lecky |
| 9,530,252 B2 | 12/2016 | Poulos et al. |
| 9,607,422 B1 | 3/2017 | Leedom |
| 9,658,737 B2 | 5/2017 | Rothenberger et al. |
| 9,817,472 B2 | 11/2017 | Lee et al. |
| 9,870,716 B1 | 1/2018 | Rao et al. |
| 9,881,420 B2 | 1/2018 | Miller |
| 9,922,462 B2 | 3/2018 | Miller |
| 10,013,625 B1 | 7/2018 | Ahammad et al. |
| 10,015,503 B1 | 7/2018 | Ahammad |
| 10,220,303 B1 | 3/2019 | Schmidt et al. |
| 10,248,284 B2 | 4/2019 | Itani et al. |
| 10,319,154 B1 | 6/2019 | Chakravarthula et al. |
| 10,335,572 B1 | 7/2019 | Kumar |
| 10,402,647 B2 | 9/2019 | Schuh |
| 10,473,935 B1 | 11/2019 | Gribetz et al. |
| 10,521,944 B2 | 12/2019 | Sareen et al. |
| 10,551,993 B1 | 2/2020 | Sanocki et al. |
| 10,715,851 B1 | 7/2020 | Shankar et al. |
| 10,783,714 B2 | 9/2020 | Diament et al. |
| 10,799,792 B2 | 10/2020 | Rios |
| 10,803,663 B2 | 10/2020 | Wang et al. |
| 10,803,862 B2 * | 10/2020 | Jang .................. G06F 3/167 |
| 10,841,292 B2 | 11/2020 | Soon-Shiong |
| 10,902,679 B2 | 1/2021 | Molyneaux et al. |
| 10,909,762 B2 | 2/2021 | Karalis et al. |
| 10,950,034 B1 | 3/2021 | Garcia et al. |
| 10,963,144 B2 | 3/2021 | Fox et al. |
| 10,996,915 B2 | 5/2021 | Kim |
| 11,009,716 B2 | 5/2021 | Kiemele et al. |
| 11,017,609 B1 | 5/2021 | Buzzerio et al. |
| 11,064,047 B1 | 7/2021 | Stegall et al. |
| 11,068,393 B2 | 7/2021 | Mandaleeka |
| 11,100,812 B2 | 8/2021 | Daniel et al. |
| 11,113,893 B2 | 9/2021 | Ma et al. |
| 11,126,320 B1 | 9/2021 | Thompson et al. |
| 11,132,052 B2 | 9/2021 | Baumbach et al. |
| 11,170,576 B2 | 11/2021 | Ravasz et al. |
| 11,176,755 B1 | 11/2021 | Tichenor et al. |
| 11,178,376 B1 | 11/2021 | Tichenor et al. |
| 11,216,152 B2 | 1/2022 | Alexander |
| 11,227,445 B1 | 1/2022 | Tichenor et al. |
| 11,238,664 B1 | 2/2022 | Tavakoli et al. |
| 11,256,341 B1 | 2/2022 | Kin et al. |
| 11,270,513 B2 | 3/2022 | Yerli |
| 11,270,522 B1 | 3/2022 | Tauber et al. |
| 11,307,647 B2 | 4/2022 | Bond et al. |
| 11,409,405 B1 | 8/2022 | Hlavac et al. |
| 11,417,054 B1 | 8/2022 | Tanner et al. |
| 11,433,304 B2 | 9/2022 | Fish et al. |
| 11,467,656 B2 | 10/2022 | Spivack |
| 11,521,361 B1 | 12/2022 | Taguchi et al. |
| 11,593,997 B2 | 2/2023 | Smith et al. |
| 11,636,655 B2 | 4/2023 | Ma et al. |
| 11,651,573 B2 | 5/2023 | Tichenor et al. |
| 11,676,348 B2 | 6/2023 | Simpson et al. |
| 11,720,167 B2 | 8/2023 | Bond et al. |
| 11,748,944 B2 | 9/2023 | Karadayi et al. |
| 11,762,952 B2 | 9/2023 | Hlavac et al. |
| 11,769,304 B2 | 9/2023 | Tichenor et al. |
| 11,798,247 B2 | 10/2023 | Karadayi et al. |
| 11,847,753 B2 | 12/2023 | Tichenor et al. |
| 11,928,308 B2 | 3/2024 | Hlavac et al. |
| 11,935,208 B2 | 3/2024 | Karadayi et al. |
| 12,130,998 B1 | 10/2024 | Roben |
| 12,197,634 B2 | 1/2025 | Bond et al. |
| 2003/0038805 A1 | 2/2003 | Wong et al. |
| 2003/0106063 A1 | 6/2003 | Guedalia |
| 2004/0237082 A1 | 11/2004 | Alcazar et al. |
| 2005/0018216 A1 | 1/2005 | Barsness et al. |
| 2008/0089587 A1 | 4/2008 | Kim et al. |
| 2008/0092111 A1 | 4/2008 | Kinnucan et al. |
| 2009/0006937 A1 | 1/2009 | Knapp et al. |
| 2009/0063381 A1 | 3/2009 | Chan et al. |
| 2009/0106234 A1 | 4/2009 | Siedlecki et al. |
| 2009/0164913 A1 | 6/2009 | Davar et al. |
| 2009/0199128 A1 | 8/2009 | Matthews et al. |
| 2009/0307623 A1 | 12/2009 | Agarawala et al. |
| 2009/0313299 A1 | 12/2009 | Bonev et al. |
| 2010/0251177 A1 | 9/2010 | Geppert et al. |
| 2010/0306716 A1 | 12/2010 | Perez |
| 2011/0185043 A1 | 7/2011 | Zeller et al. |
| 2011/0267265 A1 | 11/2011 | Stinson |
| 2012/0069168 A1 | 3/2012 | Huang et al. |
| 2012/0143358 A1 | 6/2012 | Adams et al. |
| 2012/0188279 A1 | 7/2012 | Demaine |
| 2012/0206345 A1 | 8/2012 | Langridge |
| 2012/0218301 A1 | 8/2012 | Miller |
| 2012/0249741 A1 | 10/2012 | Maciocci et al. |
| 2012/0275686 A1 | 11/2012 | Wilson et al. |
| 2012/0293544 A1 | 11/2012 | Miyamoto et al. |
| 2013/0051615 A1 | 2/2013 | Lim et al. |
| 2013/0063345 A1 | 3/2013 | Maeda |
| 2013/0069860 A1 | 3/2013 | Davidson |
| 2013/0076788 A1 | 3/2013 | Ben Zvi |
| 2013/0083173 A1 | 4/2013 | Geisner et al. |
| 2013/0117688 A1 | 5/2013 | Yerli |
| 2013/0125066 A1 | 5/2013 | Klein et al. |
| 2013/0141419 A1 | 6/2013 | Mount et al. |
| 2013/0147793 A1 | 6/2013 | Jeon et al. |
| 2013/0169682 A1 | 7/2013 | Novak et al. |
| 2013/0254884 A1 | 9/2013 | Dalcher et al. |
| 2013/0265220 A1 | 10/2013 | Fleischmann et al. |
| 2013/0293468 A1 | 11/2013 | Perez et al. |
| 2013/0336629 A1 | 12/2013 | Mulholland et al. |
| 2014/0075370 A1 | 3/2014 | Guerin et al. |
| 2014/0114845 A1 | 4/2014 | Rogers et al. |
| 2014/0125598 A1 | 5/2014 | Cheng et al. |
| 2014/0149901 A1 | 5/2014 | Hunter |
| 2014/0225922 A1 | 8/2014 | Sbardella |
| 2014/0236996 A1 | 8/2014 | Masuko et al. |
| 2014/0270494 A1 | 9/2014 | Sawhney et al. |
| 2014/0357366 A1 | 12/2014 | Koganezawa et al. |
| 2014/0375683 A1 | 12/2014 | Salter et al. |
| 2014/0375691 A1 | 12/2014 | Kasahara |
| 2015/0015504 A1 | 1/2015 | Lee et al. |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0074506 A1 | 3/2015 | Dunn et al. |
| 2015/0074742 A1 | 3/2015 | Kohno et al. |
| 2015/0077592 A1 | 3/2015 | Fahey |
| 2015/0123966 A1 | 5/2015 | Newman |
| 2015/0143302 A1 | 5/2015 | Chang et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0213371 A1 | 7/2015 | Nitz et al. |
| 2015/0220150 A1 | 8/2015 | Plagemann et al. |
| 2015/0243079 A1 | 8/2015 | Cho et al. |
| 2015/0253862 A1 | 9/2015 | Seo et al. |
| 2015/0261659 A1 | 9/2015 | Bader et al. |

(56) References Cited

U.S. PATENT DOCUMENTS

| | | |
|---|---|---|
| 2015/0269780 A1 | 9/2015 | Herman et al. |
| 2015/0302662 A1 | 10/2015 | Miller |
| 2015/0356774 A1 | 12/2015 | Gal et al. |
| 2016/0026253 A1 | 1/2016 | Bradski et al. |
| 2016/0063762 A1 | 3/2016 | Heuvel et al. |
| 2016/0110052 A1 | 4/2016 | Kim et al. |
| 2016/0133170 A1 | 5/2016 | Fateh |
| 2016/0147308 A1 | 5/2016 | Gelman et al. |
| 2016/0147408 A1 | 5/2016 | Bevis et al. |
| 2016/0170603 A1 | 6/2016 | Bastien et al. |
| 2016/0180590 A1 | 6/2016 | Kamhi et al. |
| 2016/0189368 A1 | 6/2016 | Shindo |
| 2016/0189386 A1 | 6/2016 | Michaelraj et al. |
| 2016/0260261 A1 | 9/2016 | Hsu |
| 2016/0378291 A1 | 12/2016 | Pokrzywka |
| 2017/0041388 A1 | 2/2017 | Tal et al. |
| 2017/0060230 A1 | 3/2017 | Faaborg et al. |
| 2017/0069134 A1 | 3/2017 | Shapira et al. |
| 2017/0075420 A1 | 3/2017 | Yu et al. |
| 2017/0076500 A1 | 3/2017 | Maggiore et al. |
| 2017/0084051 A1 | 3/2017 | Weising et al. |
| 2017/0099295 A1 | 4/2017 | Ricci |
| 2017/0109936 A1 | 4/2017 | Powderly et al. |
| 2017/0124230 A1 | 5/2017 | Liu et al. |
| 2017/0139478 A1 | 5/2017 | Jeon et al. |
| 2017/0192513 A1 | 7/2017 | Karmon et al. |
| 2017/0237789 A1 | 8/2017 | Harner et al. |
| 2017/0242675 A1 | 8/2017 | Deshmukh |
| 2017/0243465 A1 | 8/2017 | Bourne, Jr. et al. |
| 2017/0258526 A1 | 9/2017 | Lang |
| 2017/0262063 A1 | 9/2017 | Blenessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0311129 A1 | 10/2017 | Lopez-Uricoechea et al. |
| 2017/0323488 A1 | 11/2017 | Mott et al. |
| 2017/0364198 A1 | 12/2017 | Yoganandan et al. |
| 2017/0372225 A1 | 12/2017 | Foresti |
| 2018/0005429 A1 | 1/2018 | Osman et al. |
| 2018/0007099 A1 | 1/2018 | Ein-Gil et al. |
| 2018/0046498 A1 | 2/2018 | Park et al. |
| 2018/0059901 A1 | 3/2018 | Gullicksen |
| 2018/0082480 A1 | 3/2018 | White et al. |
| 2018/0095616 A1 | 4/2018 | Valdivia et al. |
| 2018/0095635 A1 | 4/2018 | Valdivia et al. |
| 2018/0095636 A1 | 4/2018 | Valdivia et al. |
| 2018/0096507 A1 | 4/2018 | Valdivia et al. |
| 2018/0096519 A1 | 4/2018 | Tokubo |
| 2018/0098059 A1 | 4/2018 | Valdivia et al. |
| 2018/0107278 A1 | 4/2018 | Goel et al. |
| 2018/0113599 A1 | 4/2018 | Yin |
| 2018/0121065 A1 | 5/2018 | Seo et al. |
| 2018/0158134 A1 | 6/2018 | Hassan |
| 2018/0189568 A1 | 7/2018 | Powderly et al. |
| 2018/0189647 A1 | 7/2018 | Calvo et al. |
| 2018/0300557 A1 | 10/2018 | Rodenas et al. |
| 2018/0307303 A1 | 10/2018 | Powderly et al. |
| 2018/0314484 A1 | 11/2018 | Pahud et al. |
| 2018/0315162 A1 | 11/2018 | Sturm et al. |
| 2018/0322701 A1 | 11/2018 | Pahud et al. |
| 2018/0323972 A1 | 11/2018 | Reed et al. |
| 2018/0335925 A1 | 11/2018 | Hsiao et al. |
| 2018/0350144 A1 | 12/2018 | Rathod |
| 2018/0357780 A1 | 12/2018 | Young et al. |
| 2018/0365897 A1 | 12/2018 | Pahud et al. |
| 2019/0005724 A1 | 1/2019 | Pahud et al. |
| 2019/0018498 A1 | 1/2019 | West et al. |
| 2019/0043259 A1 | 2/2019 | Wang et al. |
| 2019/0094981 A1 | 3/2019 | Bradski et al. |
| 2019/0096131 A1 | 3/2019 | Crews et al. |
| 2019/0107894 A1 | 4/2019 | Hebbalaguppe et al. |
| 2019/0107991 A1 | 4/2019 | Spivack et al. |
| 2019/0108578 A1 | 4/2019 | Spivack et al. |
| 2019/0108682 A1 | 4/2019 | Spivack et al. |
| 2019/0114061 A1 | 4/2019 | Daniels et al. |
| 2019/0130656 A1 | 5/2019 | Gebbie et al. |
| 2019/0130788 A1 | 5/2019 | Seaton |
| 2019/0155481 A1 | 5/2019 | Diverdi et al. |
| 2019/0163700 A1 | 5/2019 | Baumgardner et al. |
| 2019/0172262 A1 | 6/2019 | McHugh et al. |
| 2019/0197785 A1 | 6/2019 | Tate-Gans et al. |
| 2019/0212827 A1 | 7/2019 | Kin et al. |
| 2019/0213792 A1 | 7/2019 | Jakubzak et al. |
| 2019/0221035 A1 | 7/2019 | Clark et al. |
| 2019/0235729 A1 | 8/2019 | Day et al. |
| 2019/0237044 A1 | 8/2019 | Day et al. |
| 2019/0258318 A1 | 8/2019 | Qin et al. |
| 2019/0278376 A1 | 9/2019 | Kutliroff et al. |
| 2019/0278432 A1* | 9/2019 | Bennett ................ G06F 3/0484 |
| 2019/0279424 A1 | 9/2019 | Clausen et al. |
| 2019/0279426 A1 | 9/2019 | Musunuri et al. |
| 2019/0286231 A1 | 9/2019 | Burns et al. |
| 2019/0294721 A1 | 9/2019 | Keifer et al. |
| 2019/0294889 A1 | 9/2019 | Sriram et al. |
| 2019/0340799 A1 | 11/2019 | Dryer et al. |
| 2019/0340833 A1 | 11/2019 | Furtwangler et al. |
| 2019/0362562 A1 | 11/2019 | Benson |
| 2019/0369391 A1 | 12/2019 | Cordesses et al. |
| 2019/0371060 A1 | 12/2019 | Energin et al. |
| 2019/0371279 A1 | 12/2019 | Mak |
| 2019/0377406 A1 | 12/2019 | Steptoe et al. |
| 2019/0377416 A1 | 12/2019 | Alexander |
| 2019/0377487 A1 | 12/2019 | Bailey et al. |
| 2019/0377538 A1 | 12/2019 | Jones et al. |
| 2019/0385371 A1 | 12/2019 | Joyce et al. |
| 2020/0013211 A1 | 1/2020 | Bergen et al. |
| 2020/0042108 A1 | 2/2020 | Wan |
| 2020/0065584 A1 | 2/2020 | Iyer et al. |
| 2020/0066047 A1 | 2/2020 | Karalis et al. |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0111256 A1 | 4/2020 | Bleyer et al. |
| 2020/0151965 A1 | 5/2020 | Forbes et al. |
| 2020/0218423 A1 | 7/2020 | Ohashi |
| 2020/0219319 A1 | 7/2020 | Lashmar et al. |
| 2020/0225495 A1 | 7/2020 | Kiemele et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0226823 A1 | 7/2020 | Stachniak et al. |
| 2020/0241300 A1 | 7/2020 | Robinson et al. |
| 2020/0242842 A1 | 7/2020 | Fukazawa et al. |
| 2020/0279386 A1 | 9/2020 | Da Veiga |
| 2020/0279429 A1 | 9/2020 | Upadhyay et al. |
| 2020/0285761 A1 | 9/2020 | Buck et al. |
| 2020/0289934 A1 | 9/2020 | Azmandian et al. |
| 2020/0312028 A1 | 10/2020 | Charvat et al. |
| 2020/0334908 A1 | 10/2020 | Wilson et al. |
| 2020/0342673 A1 | 10/2020 | Lohr et al. |
| 2020/0351273 A1 | 11/2020 | Thomas |
| 2020/0363924 A1 | 11/2020 | Flexman et al. |
| 2020/0363930 A1 | 11/2020 | Srinivasan et al. |
| 2020/0368616 A1 | 11/2020 | Delamont |
| 2020/0375666 A1 | 12/2020 | Murphy |
| 2020/0394935 A1 | 12/2020 | Ray et al. |
| 2020/0402320 A1 | 12/2020 | Crews et al. |
| 2021/0012113 A1 | 1/2021 | Petill et al. |
| 2021/0014408 A1 | 1/2021 | Timonen et al. |
| 2021/0026441 A1 | 1/2021 | Spivack |
| 2021/0096726 A1 | 4/2021 | Faulkner et al. |
| 2021/0097768 A1 | 4/2021 | Malia et al. |
| 2021/0103449 A1 | 4/2021 | Terpstra et al. |
| 2021/0111890 A1 | 4/2021 | Reed et al. |
| 2021/0124821 A1 | 4/2021 | Spivak et al. |
| 2021/0125414 A1 | 4/2021 | Berkebile |
| 2021/0126823 A1 | 4/2021 | Poess et al. |
| 2021/0158594 A1 | 5/2021 | Huang et al. |
| 2021/0158608 A1 | 5/2021 | Boggs et al. |
| 2021/0183114 A1 | 6/2021 | Corson |
| 2021/0191600 A1 | 6/2021 | Lemay et al. |
| 2021/0192856 A1 | 6/2021 | Lee |
| 2021/0272375 A1 | 9/2021 | Lashmar et al. |
| 2021/0295602 A1 | 9/2021 | Scapel et al. |

(56) References Cited

U.S. PATENT DOCUMENTS

| | | |
|---|---|---|
| 2021/0306238 A1 | 9/2021 | Cheng et al. |
| 2021/0322856 A1 | 10/2021 | Virkar et al. |
| 2021/0373741 A1 | 12/2021 | Agarawala et al. |
| 2021/0378768 A1 | 12/2021 | Olson et al. |
| 2021/0390765 A1 | 12/2021 | Laaksonen et al. |
| 2022/0038522 A1 | 2/2022 | Goolkasian et al. |
| 2022/0068035 A1 | 3/2022 | Tichenor et al. |
| 2022/0084279 A1 | 3/2022 | Lindmeier et al. |
| 2022/0091722 A1 | 3/2022 | Faulkner et al. |
| 2022/0100265 A1 | 3/2022 | Kies et al. |
| 2022/0100279 A1 | 3/2022 | Lee et al. |
| 2022/0101612 A1 | 3/2022 | Palangie et al. |
| 2022/0121344 A1 | 4/2022 | Pastrana Vicente et al. |
| 2022/0122329 A1 | 4/2022 | Tichenor et al. |
| 2022/0139052 A1 | 5/2022 | Tavakoli et al. |
| 2022/0161422 A1 | 5/2022 | Chen et al. |
| 2022/0211188 A1 | 7/2022 | Daub et al. |
| 2022/0261088 A1 | 8/2022 | Pinchon et al. |
| 2022/0276765 A1 | 9/2022 | Hlavac et al. |
| 2022/0318035 A1* | 10/2022 | Garstenauer ............ G06F 9/451 |
| 2022/0358715 A1 | 11/2022 | Tanner et al. |
| 2022/0406021 A1 | 12/2022 | LeBeau et al. |
| 2022/0414403 A1 | 12/2022 | Hlavac et al. |
| 2023/0004943 A1 | 1/2023 | Øhrn et al. |
| 2023/0016490 A1 | 1/2023 | Berkebile |
| 2023/0022194 A1 | 1/2023 | Soryal |
| 2023/0056976 A1 | 2/2023 | Tanner et al. |
| 2023/0126837 A1 | 4/2023 | Karadayi et al. |
| 2023/0127438 A1 | 4/2023 | Karadayi et al. |
| 2023/0134355 A1 | 5/2023 | Lansel et al. |
| 2023/0152851 A1 | 5/2023 | Berliner et al. |
| 2023/0168737 A1 | 6/2023 | Pratt et al. |
| 2023/0169737 A1 | 6/2023 | Taguchi et al. |
| 2023/0196766 A1 | 6/2023 | Pla I Conesa et al. |
| 2023/0215120 A1 | 7/2023 | Ma et al. |
| 2023/0221797 A1 | 7/2023 | Louie et al. |
| 2023/0244755 A1 | 8/2023 | Hlavac et al. |
| 2023/0245386 A1 | 8/2023 | Karadayi et al. |
| 2023/0260000 A1 | 8/2023 | Belavy |
| 2023/0260233 A1 | 8/2023 | Goncalves et al. |
| 2023/0290089 A1 | 9/2023 | Simpson et al. |
| 2023/0367611 A1 | 11/2023 | Blakeley et al. |
| 2023/0384859 A1 | 11/2023 | Bond et al. |
| 2023/0410436 A1 | 12/2023 | Beauchamp et al. |
| 2023/0419616 A1 | 12/2023 | Dudovitch et al. |
| 2023/0419998 A1 | 12/2023 | Nguyen et al. |
| 2024/0045495 A1 | 2/2024 | Elhadad et al. |
| 2024/0061547 A1 | 2/2024 | Fleizach et al. |
| 2024/0095699 A1 | 3/2024 | Sinha et al. |
| 2024/0126406 A1 | 4/2024 | Hlavac et al. |
| 2024/0153205 A1 | 5/2024 | Huergo Wagner et al. |
| 2024/0233292 A1 | 7/2024 | Tichenor et al. |
| 2024/0250955 A1 | 7/2024 | Lebeau et al. |
| 2024/0264851 A1 | 8/2024 | Blakeley et al. |
| 2024/0288995 A1 | 8/2024 | Short et al. |
| 2024/0310992 A1* | 9/2024 | Wan ....................... G06F 3/0482 |
| 2024/0311498 A1 | 9/2024 | Millberg et al. |
| 2024/0312143 A1 | 9/2024 | Millberg et al. |
| 2024/0331287 A1 | 10/2024 | Karadayi et al. |
| 2024/0331312 A1 | 10/2024 | Freeman et al. |
| 2024/0331320 A1 | 10/2024 | Taguchi et al. |
| 2024/0338070 A1 | 10/2024 | Tanner et al. |
| 2024/0361837 A1 | 10/2024 | Louie et al. |
| 2024/0402869 A1 | 12/2024 | Boesel et al. |
| 2025/0036431 A1* | 1/2025 | Han ....................... G06Q 50/10 |
| 2025/0060812 A1 | 2/2025 | Bond et al. |
| 2025/0166322 A1 | 5/2025 | Simpson et al. |

FOREIGN PATENT DOCUMENTS

| | | |
|---|---|---|
| CN | 111095165 B | 11/2024 |
| EP | 2887322 B1 | 2/2020 |
| EP | 4439247 A1 | 10/2024 |
| EP | 4439248 A1 | 10/2024 |
| JP | 2014515962 A | 7/2014 |
| JP | 2016148968 A | 8/2016 |
| JP | WO2014097706 A1 | 1/2017 |
| JP | 2017536618 A | 12/2017 |
| JP | 2019101743 A | 6/2019 |
| JP | 2019527881 A | 10/2019 |
| JP | 2022147265 A | 10/2022 |
| KR | 20170087501 A | 7/2017 |
| WO | 2014097706 A1 | 6/2014 |
| WO | 2015192117 A1 | 12/2015 |
| WO | 2016041088 A1 | 3/2016 |
| WO | 2018235371 A1 | 12/2018 |
| WO | 2019143839 A1 | 7/2019 |
| WO | 2020159302 A1 | 8/2020 |
| WO | 2020226832 A1 | 11/2020 |
| WO | 2021163373 A1 | 8/2021 |
| WO | 2022055822 A1 | 3/2022 |
| WO | 2024039666 A1 | 2/2024 |
| WO | 2024086325 A1 | 4/2024 |

OTHER PUBLICATIONS

Fleury C., et al., "A Generic Model for Embedding Users' Physical Workspaces into Multi-Scale Collaborative Virtual Environments," 20th International Conference on Artificial Reality and Telexistence, Dec. 3, 2010, 8 pages.

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2021/044098, mailed Mar. 9, 2023, 18 pages.

International Search Report and Written Opinion for International Application No. PCT/US2020/051763, mailed Feb. 3, 2021, 11 Pages.

International Search Report and Written Opinion for International Application No. PCT/US2022/032288, mailed Sep. 16, 2022, 11 pages.

International Search Report and Written Opinion for International Application No. PCT/US2022/045510, mailed Jan. 19, 2023, 10 pages.

International Search Report and Written Opinion for International Application No. PCT/US2022/053780, mailed Mar. 20, 2023, 10 pages.

Invitation to Pay Additional Fees for International Application No. PCT/US2021/044098, Nov. 3, 2021, 15 pages.

Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Melnick K., "Google Rolls out New AR Features for Its Lens APP," May 28, 2019, Retrieved from the Internet: URL: https://vrscout.com/news/new-ar-features-google-lens/ , 3 pages.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et al., "EyePointing: A Gaze-Based Selection Technique," Proceedings of Mensch and Computer, Hamburg, Germany, Sep. 8-11, 2019, pp. 719-723.

Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.

Vitzthum A., "SSIML/Behaviour: Designing Behaviour and Animation of Graphical Objects in Virtual Reality and Multimedia Applications," Proceedings of the Seventh IEEE International Symposium on Multimedia, Dec. 12, 2005, 9 pages.

(56) References Cited

OTHER PUBLICATIONS

International Search Report and Written Opinion for International Application No. PCT/US2023/021312, mailed Aug. 24, 2023, 15 pages.
Wikipedia, "Multiple-document Interface," May 8, 2022 [retrieved on Aug. 16, 2023], 5 pages, Retrieved from the Internet: URL: https://web.archive.org/web/20220508091934/https://en.wikipedia.org/wiki/Multipledocument_interface.
European Search Report for European Patent Application No. 24155337.9, dated Jul. 2, 2024, 7 pages.
European Search Report for European Patent Application No. 24156842.7, dated Jun. 25, 2024, 6 pages.
International Preliminary Report on Patentability for International Application No. PCT/US2022/045510, mailed May 10, 2024, 9 pages.
International Preliminary Report on Patentability for International Application No. PCT/US2022/053780, mailed Jul. 4, 2024, 9 pages.
Office Action mailed Jun. 25, 2024 for Japanese Patent Application No. 2021-577408, filed on Aug. 8, 2020, 4 pages.
Tatzgern M., et al., "Adaptive Information Density for Augmented Reality Displays," IEEE Virtual Reality Conference, Mar. 19-23, 2016, pp. 83-92.
Advisory Action mailed Oct. 13, 2021 for U.S. Appl. No. 16/567,563, filed Sep. 11, 2019, 3 pages.
"App Clips," Apple Developer, 2022, 4 pages, Retrieved from the Internet: URL: https://developer.apple.com/app-clips/.
Final Office Action mailed Aug. 5, 2021 for U.S. Appl. No. 16/567,563, filed Sep. 11, 2019, 11 Pages.
"Google Play Instant," Retrieved on [Jan. 27, 2022], 2 pages, Retrieved from the Internet: URL: https://developer.android.com/topic/google-play-instant.
International Preliminary Report on Patentability for International Application No. PCT/US2020/045538, mailed Mar. 24, 2022, 9 pages.
International Preliminary Report on Patentability for International Application No. PCT/US2022/032288, mailed Jan. 11, 2024, 10 pages.
International Preliminary Report on Patentability for International Application No. PCT/US2022/033338, mailed Jan. 11, 2024, 11 pages.
International Preliminary Report on Patentability for International Application No. PCT/US2022/040484, mailed Feb. 29, 2024, 9 pages.
International Search Report and Written Opinion for International Application No. PCT/US2020/045538, mailed Oct. 23, 2020, 11 Pages.
International Search Report and Written Opinion for International Application No. PCT/US2022/020292 mailed Aug. 17, 2022, 17 pages.
International Search Report and Written Opinion for International Application No. PCT/US2022/031840, mailed Sep. 13, 2022, 13 pages.
International Search Report and Written Opinion for International Application No. PCT/US2022/033338 mailed Sep. 6, 2022, 13 pages.
International Search Report and Written Opinion for International Application No. PCT/US2022/040484, mailed Nov. 25, 2022, 11 pages.
International Search Report and Written Opinion for International Application No. PCT/US2022/054413, mailed Jul. 7, 2023, 11 pages.
Non-Final Office Action mailed Dec. 8, 2022 for U.S. Appl. No. 17/659,431, filed Apr. 15, 2022, 12 pages.
Non-Final Office Action mailed Jan. 25, 2021 for U.S. Appl. No. 16/567,563, filed Sep. 11, 2019, 10 Pages.
Notice of Allowance mailed Dec. 21, 2021 for U.S. Appl. No. 16/567,563, filed Sep. 11, 2019, 6 pages.
Notice of Allowance mailed Mar. 21, 2023 for U.S. Appl. No. 17/659,431, filed Apr. 15, 2022, 5 pages.
Office Action mailed Aug. 21, 2023 for Chinese Application No. 202080054473.3, filed Aug. 8, 2020, 7 pages.
Office Action mailed Feb. 26, 2024 for European Patent Application No. 20761419.9, filed on Aug. 8, 2020, 7 pages.
Prosecution History of U.S. Appl. No. 16/567,563 dated Jan. 25, 2021, through Dec. 21, 2021, 52 pages.
Wikipedia: "Simultaneous Localization and Mapping," Jul. 25, 2017, 7 pages, Retrieved from the Internet: URL: https://en.wikipedia.org/w/index.php?title=Simultaneous_localization_and_mapping&oldid=731478358 [Retrieved on Oct. 23, 2017].
European Search Report for European Patent Application No. 24155099.5, dated Aug. 5, 2024, 7 pages.
European Search Report for European Patent Application No. 24158455.6, dated Jun. 28, 2024, 6 pages.
International Preliminary Report on Patentability for International Application No. PCT/US2022/054413, mailed Jul. 25, 2024, 9 pages.
International Preliminary Report on Patentability for International Application No. PCT/US2023/021312, mailed Nov. 21, 2024, 14 pages.
European Search Report for European Patent Application No. 24159313.6, dated May 21, 2024, 6 pages.
Final Office Action mailed Jun. 11, 2025 for U.S. Appl. No. 18/194,221, filed Mar. 31, 2023, 19 pages.
Non-Final Office Action mailed May 22, 2025 for U.S. Appl. No. 18/183,597, filed Mar. 14, 2023, 23 pages.
Office Action mailed Mar. 4, 2025 for European Patent Application No. 22735726.6, filed on Jun. 1, 2022, 5 pages.
Virtus Learning Hub., "How To Use Virtual Reality In Unreal Engine 5 | Beginner Tutorial," Jul. 15, 2022, 3 pages, Retrieved from the Internet URL: https://www.youtube.com/watch?v=DiGh6MxDFds.
Non-Final Office Action mailed Oct. 6, 2025 for U.S. Appl. No. 18/636,891, filed Apr. 16, 2024, 16 pages.
Notice of Allowance mailed Oct. 7, 2025 for U.S. Appl. No. 18/296,641, filed Apr. 6, 2023, 5 pages.
Non-Final Office Action mailed Aug. 8, 2025 for U.S. Appl. No. 18/738,681, filed Jun. 10, 2024, 15 pages.
Non-Final Office Action mailed Aug. 27, 2025 for U.S. Appl. No. 18/937,886, filed Nov. 5, 2024, 12 pages.
Non-Final Office Action mailed Jun. 30, 2025 for U.S. Appl. No. 18/183,607, filed Mar. 14, 2023, 19 pages.
Office Action mailed Mar. 13, 2025 for Korean Application No. 10-2022-7011363, filed Aug. 8, 2020, 12 pages.
Office Action mailed Mar. 18, 2025 for Japanese Application No. 2023-507458, filed on Jul. 31, 2021, 9 pages.
Office Action mailed Sep. 19, 2025 for European Patent Application No. 22740636.0, filed on Jun. 5, 2022, 8 pages.
Office Action mailed Jul. 8, 2025 for Japanese Patent Application No. 2023-507458, filed on Jul. 31, 2021, 3 pages.
Office Action mailed Sep. 16, 2025 for Japanese Patent Application No. 2023-545773, filed on Mar. 15, 2022, 5 pages.
Office Action mailed Aug. 19, 2025 for Korean Application No. 10-2023-7007911, filed Jul. 31, 2021, 7 pages.
Office Action mailed Nov. 24, 2025 for Korean Application No. 10-2022-7011363, filed Aug. 8, 2020, 3 pages.
Office Action mailed Dec. 15, 2025 for European Patent Application No. 24156842.7, filed on Feb. 9, 2024, 8 pages.
Office Action mailed Dec. 17, 2025 for Korean Application No. 10-2023-7027954, filed Mar. 15, 2022, 14 pages.

\* cited by examiner

RENDERING AN ARTIFICIAL REALITY ENVIRONMENT BASED ON A DEFINED HIERARCHY OF MULTIPLE STATES INCLUDING MULTIPLE ARTIFICIAL REALITY EXPERIENCES WITH AUGMENTS

TECHNICAL FIELD

The present disclosure is directed to an augmented world environment model for an artificial reality environment.

BACKGROUND

Artificial reality (XR) devices are becoming more prevalent. As they become more popular, the applications implemented on such devices are becoming more sophisticated. Augmented reality (AR) applications can provide interactive 3D experiences that combine images of the real-world with virtual objects, while virtual reality (VR) applications can provide an entirely self-contained 3D computer environment. For example, an AR application can be used to superimpose virtual objects over a video feed of a real scene that is observed by a camera. A real-world user in the scene can then make gestures captured by the camera that can provide interactivity between the real-world user and the virtual objects. Mixed reality (MR) systems can allow light to enter a user's eye that is partially generated by a computing system and partially includes light reflected off objects in the real-world. AR, MR, and VR experiences can be observed by a user through a head-mounted display (HMD), such as glasses or a headset.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
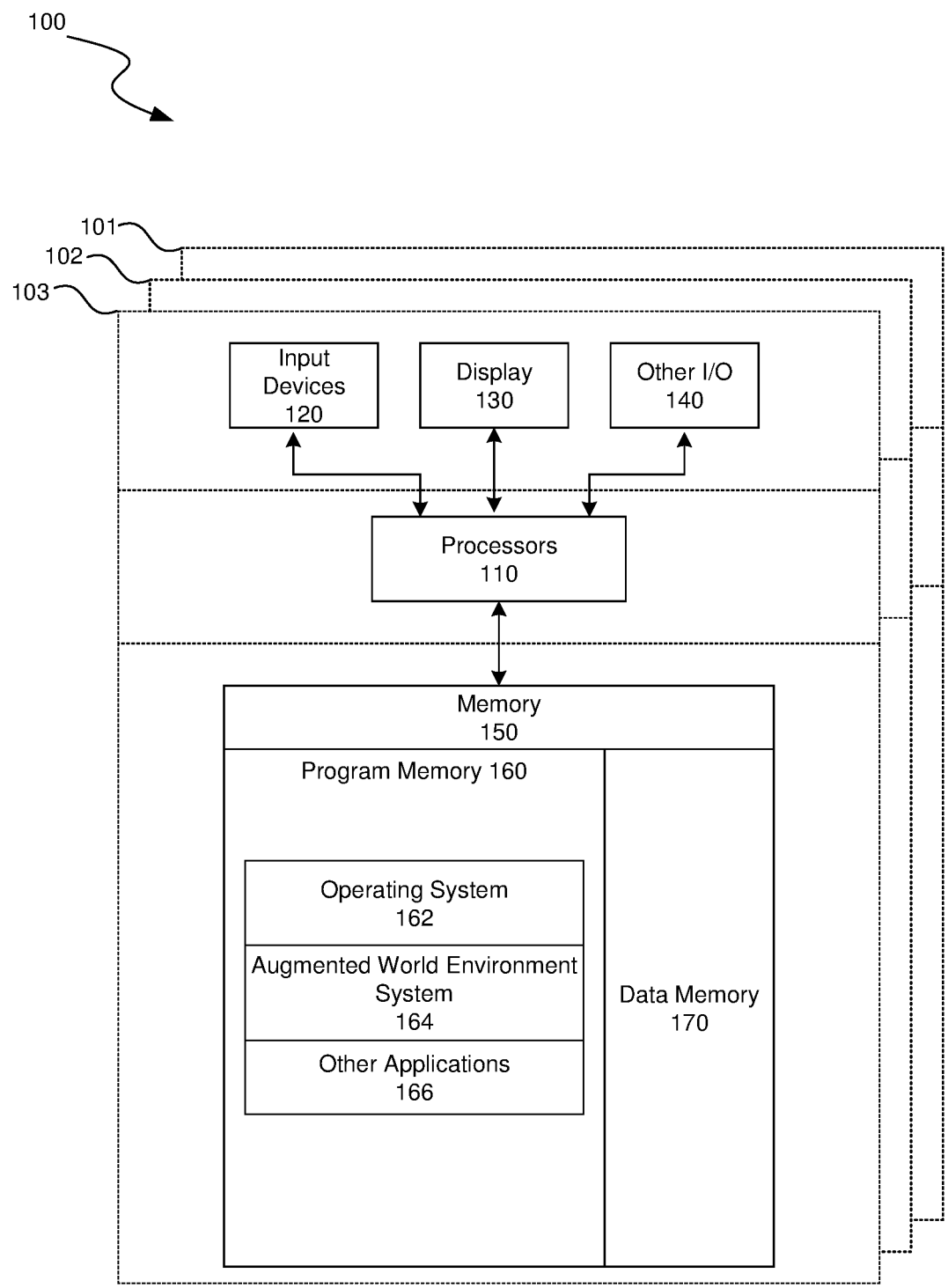
FIG. 1 is a block diagram illustrating an overview of devices on which some implementations of the present technology can operate.

Aspects of the present disclosure are directed to providing an augmented world environment model for an artificial reality (XR) environment. Some implementations of the present technology define how experiences will run on an XR system as a hierarchy of entities, including experiences (i.e., applications), augments those experiences create, and an exclusive mode in which a particular experience takes control of the entire view. Some implementations establish a framework for multiple experiences to interface with each other and to run in an XR ecosystem, e.g., with a user interacting with the experiences and the real world simultaneously. This can improve upon traditional mobile and desktop operating systems by providing different states optimized for XR, which can include improved utilization of resources on an XR device, such as an XR head-mounted display (HMD). In some implementations, experiences manage augments—experiences have states including active, foregrounded, backgrounded, not running, and closed, while augments have states such as focused, displayed, minimized, unloaded, and closed. Experiences and augments can enter a particular state based on criteria, and can be, based on the state, processed and/or displayed using different resources by an operating system or provided with particular capabilities.

For example, in some implementations, an experience can be in an active state either 1) upon initial launch of the experience, or 2) by receiving user engagement with its augment, both of which can also cause its augment to be in a focused state. Once an experience is in an active state, its capabilities can include A) closing augments, B) creating augments, C) manipulating augments, and D) moving augments from body-leashed to world-locked, which can be exclusive capabilities for the XR experience having the active experience state. In some implementations, the XR system enters exclusive mode for a particular experience in which other experiences and their augments are temporarily hidden, and augment constraints and spatial rules existing in the augmented world environment are no longer applied.

Some implementations allow for both visual and auditory XR experiences in an augmented world environment. For example, a user can launch an XR gallery experience on an XR device, causing an augment to appear. The XR gallery experience can become active, and the gallery augment can be loaded and focused. The user can interact with the existing augment to fill it with virtual art, and place the augment in a world-locked position overlaid on a view of his real-world wall. While the user is interacting with the augment, the XR gallery experience can stay in an active state, and the gallery augment can remain focused. The user can then open an XR music experience, and a music augment can be created. The XR music experience can instead become active, and the XR gallery experience can be foregrounded. The gallery augment can now transition from the focused state to be in a displayed state. The music augment can instead transition to being loaded and focused. The user can play music, then glance around. The augments can briefly exit, then return, to the field-of-view of the user. Since the user is not actively engaged with the XR music experience, the XR music experience can be foregrounded. Thus, neither the gallery augment nor the music augment are in the focused state, but both are now displayed while the user looks around his space. In some implementations, the music augment is attached to the position of the headset and thus virtually moves relative to the headset.

The user can minimize the music augment in body space, and the music can continue to play. Body space can refer to the physical space surrounding a body of a headset wearing user in the real world (e.g., within a distance reachable by a determined typical arm length or a specific arm length determined for the current user). Thus, the XR music experience can be backgrounded, and the XR gallery experience can remain foregrounded. The music augment can remain loaded, since it is still in body space, and the gallery augment can remain displayed. The user can then sit down in a different room, causing the XR music experience to remain backgrounded, and the XR gallery experience to stop running. The music augment can remain loaded, since it is still in body space, but the gallery augment can be unloaded because it is world-locked to a different room and is no longer in the body space of the user. Then, the user can access an experience/augment manager, and see the XR gallery experience and the gallery augment (even though the XR gallery experience is invisible to the user in his field-of-view), as well as the XR music experience and the music augment, which can cause no change in state for either of the XR experiences or augments. The user can then walk back into the original room, causing the gallery augment to become immediately visible. The XR music experience can remain backgrounded, while the XR gallery experience can become foregrounded. Both the music augment and the gallery augment can remain loaded.

Some implementations differentiate between closing of XR experiences and closing of augments in an augmented world environment. For example, a user can start an XR gallery experience and place three decorative augments overlaid onto her real-world environment (e.g., a first augment, a second augment, and a third augment). Because the XR gallery experience has been launched, it becomes active. The first augment, second augment, and third augment are opened, and the XR gallery experience can select the second augment to be focused. The user can close the XR gallery experience through an experience/augment manager, causing all three augments to disappear. In other words, the XR gallery experience can be closed, as well as all three of its augments. A few minutes later, the user can re-open the XR gallery experience, and all three augments can reappear in the same place with respect to the real-world environment. Upon re-launch, the XR gallery experience can select the first augment to be focused. Because the XR gallery experience has been re-launched, it can become active, and all of its augments can be opened. In some implementations, the XR gallery experience can decide to preserve the augments, although in other implementations, this is not necessary, as is described below. The user can close the first augment having the augment state, causing the first augment to become closed, and the XR gallery experience can be foregrounded. The user can then close the remaining augments (i.e., the second and third augments), causing the XR gallery experience to close. The user can again re-launch the XR gallery experience, causing it to become active, and the XR gallery experience can select an initial "home scene" augment to appear, without the three previous augments being persisted.

Some implementations of the present technology are used in conjunction with augmented calling in an augmented world environment. For example, a user can start an augmented call via an XR calling experience, causing the XR calling experience to become active. A corresponding calling augment can be opened and be focused. Because the XR calling experience is in an active state, the user can world-lock the calling augment. The XR calling experience can remain active, and the calling augment can remain focused. The user can look away from the calling augment and not look back, removing it from the user's field-of view. Thus, the XR calling experience can come foregrounded, and the calling augment can lose its focus and enter a displayed state. The user can then move locations, causing the XR calling experience to become backgrounded, but the XR calling experience can continue working to keep the call audio running. The calling augment can become unloaded when the user moves locations. In some implementations, the headset determines whether the user moves locations by utilizing cameras combined with Simultaneous Localization and Mapping (SLAM) techniques. The user can then return to the original location, returning the calling augment to the field-of-view, but the user does not engage with the augment. Thus, the XR calling experience can become foregrounded, and the calling augment can enter a displayed state. The user can then interact with the calling augment, causing the XR calling experience to become active, and the calling augment to become focused.

Some implementations of the present technology allow for an exclusive mode for an XR experience outside of an augmented world environment. For example, a user can open a launcher and select an XR experience of a virtual reality (VR) game, which is an exclusive mode. The XR experience can be launched and enter into an active experience state. The exclusive mode can open, and the user can be removed from the augmented world environment, while the XR experience remains active. The XR device can determine that it needs to show a system dialog, such as the battery getting too low, which the user must respond to. Based on the system dialog, the XR experience can become foregrounded. The user can then dismiss the dialog to return to playing the VR game, returning the XR experience to an active state.

Some implementations of the present technology allow for multi-tasking of augments within an augmented world environment. For example, a user can open a launcher and select an XR social media experience, causing the XR social media experience to become active, and its augment to appear focused in body space. The user can see a call-to-action to view a product within the social media augment. The XR social media experience can remain active, and its augment can remain focused. The user can decide to buy the product, and begin to fill out a form, populating the first field. The XR social media experience can continue to remain active, and its augment can continue to remain focused. The user can then realize that he needs to switch to another XR experience to get information to input into the form. The user can perform a gesture to bring up a launcher. The XR social media experience can be backgrounded, and its augment can be minimized. The user can select an XR notes experience, creating a notes augment in body space. Thus, the XR notes experience can become active, and the notes augment can become focused. The user can navigate the XR notes experience to copy details for the form he is looking to fill out. The XR notes experience can remain active, and the notes augment can remain focused. The user can open a task switcher to return back to the XR social media experience. The XR notes experience can be backgrounded, and the notes augment can be minimized. The user can select the XR social media experience, and its corresponding augment can be shown with the form retaining the prior information that the user previously entered. The XR social media experience can become active, and its augment can be focused. The user can then paste his details into the form, completing the remainder of the fields. The XR social media experience can remain active, and its augment can remain focused.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Some implementations provide specific technological improvements in the area of coordinating and rendering multiple XR experiences and their augments on an XR device for a user. Some implementations define a hierarchy of XR experiences and augments having various states, and can prioritize allocation of compute resources and capabilities of XR experiences based on the hierarchy. Traditionally, multiple XR experiences can be rendered on an XR device without such a hierarchy, thereby allowing a large amount of resources to be consumed equally by each experience or augment. Implementations address this problem and others by providing systems and methods that moderate, reduce, and/or conserve battery power, heat production, bandwidth, and/or processing power on XR systems and devices by moderating, minimizing, or not displaying less priority augments on the XR device, as well as limiting what capabilities particular XR experiences can perform on the XR device, without affecting user experience. In some implementations, user comprehension of the artificial reality environment can be improved by simplifying what is seen in the user's field-of-view and what actions can be taken with respect to XR experiences. In addition, some implementations can improve the functionality of XR systems by both conserving resources as noted above and selectively increasing processing speeds when applying the moderated or minimized augments (or entirely eliminating the display of unnecessary augments), allowing for more efficient and longer lasting XR experiences.

Several implementations are discussed below in more detail in reference to the figures. FIG. 1 is a block diagram illustrating an overview of devices on which some implementations of the disclosed technology can operate. The devices can comprise hardware components of a computing system 100 that can provide and augmented world environment model for an artificial reality (XR) environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, augmented world environment system 164, and other application programs 166. Memory 150 can also include data memory 170 that can include, e.g., XR experience data, experience state data, augment data, augment state data, layout data, rendering data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
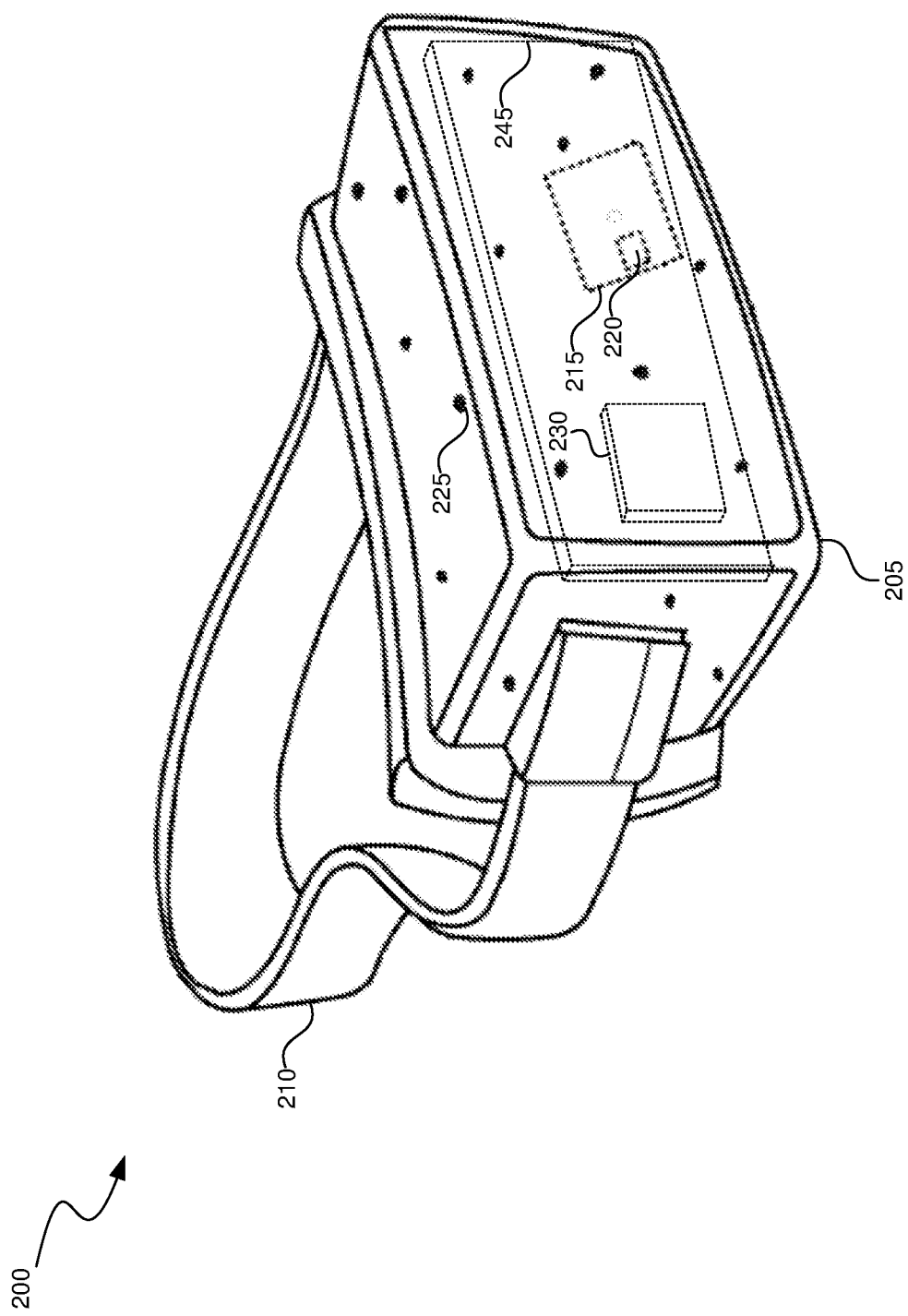
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
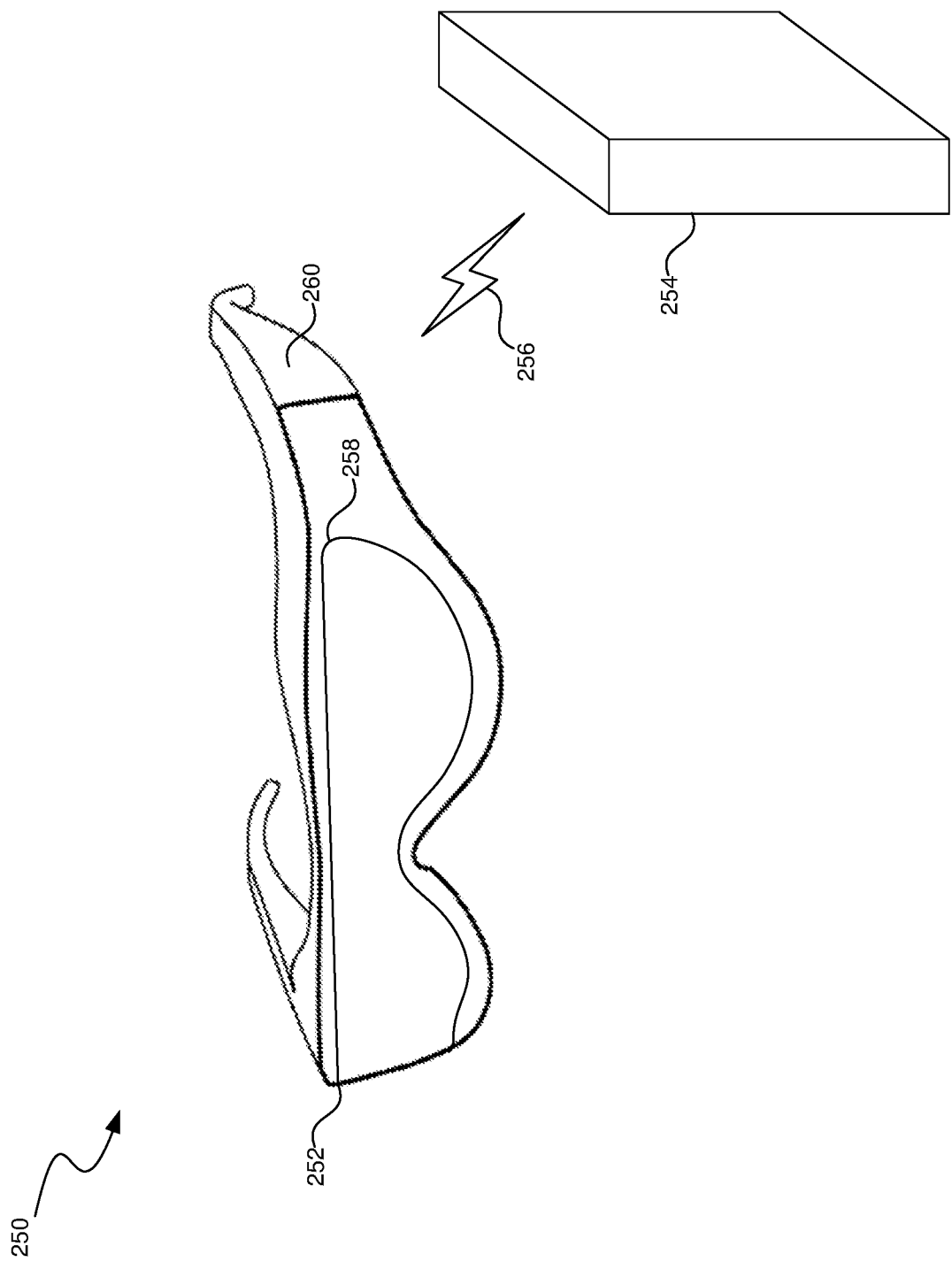
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
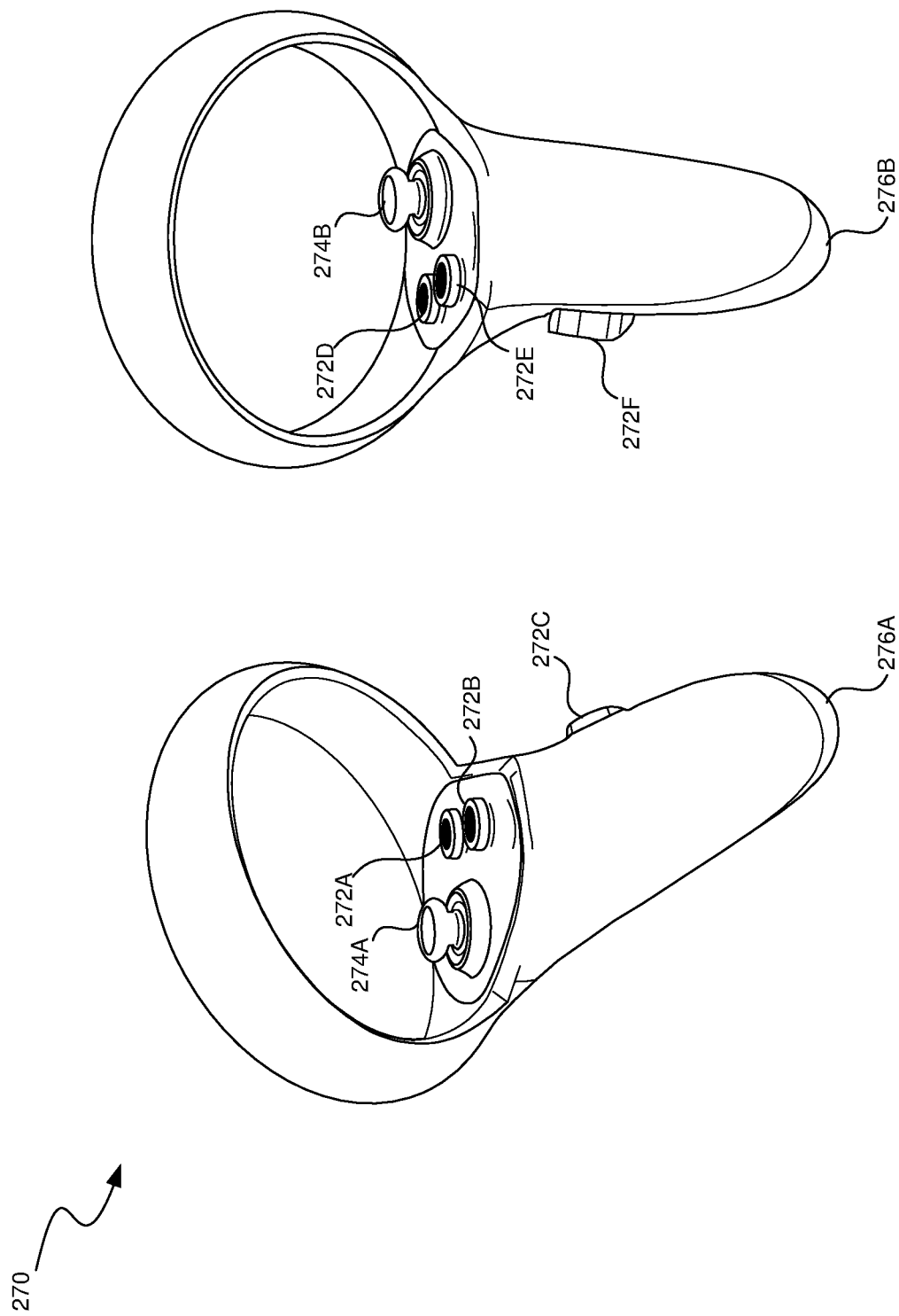
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
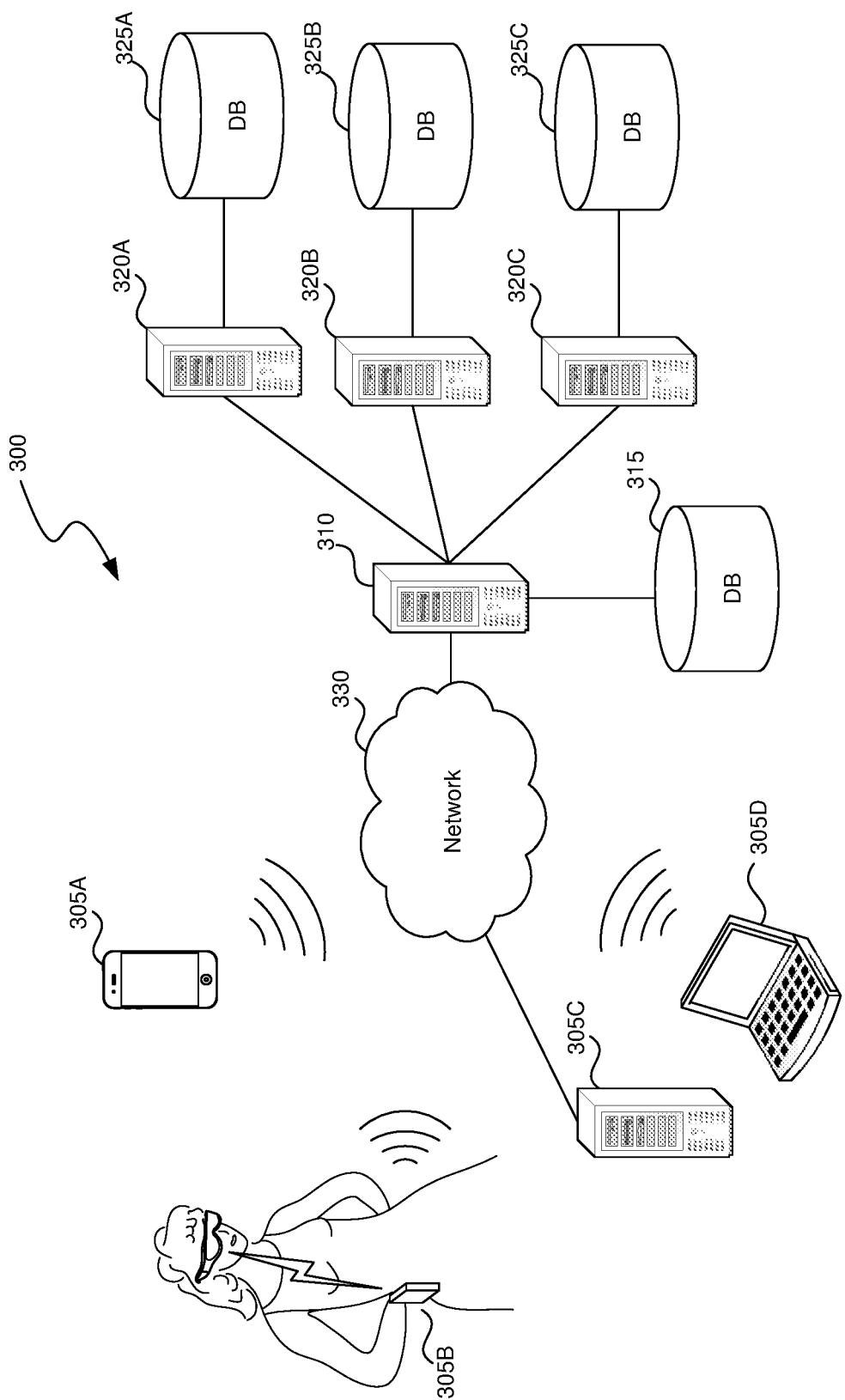
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
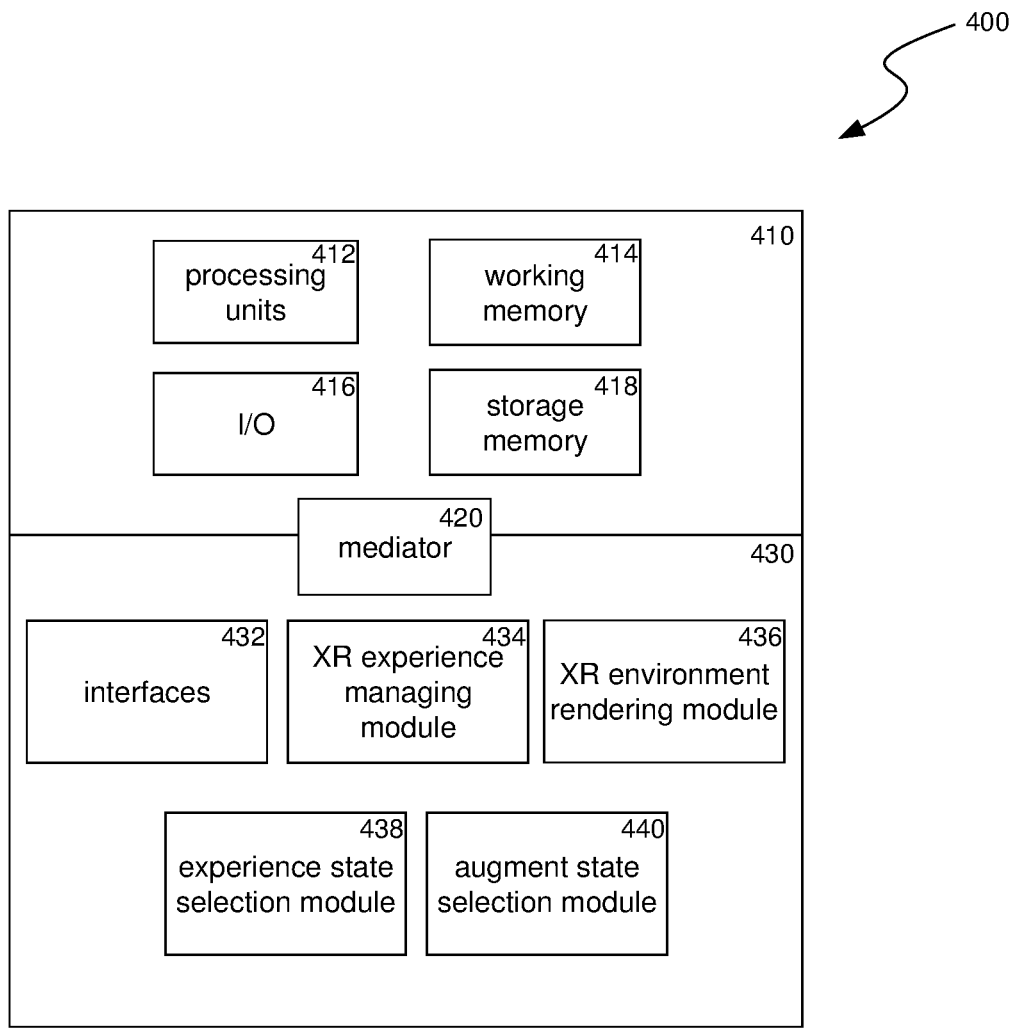
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for providing an augmented world environment model for an artificial reality (XR) environment. Specialized components 430 can include XR experience managing module 434, XR environment rendering module 436, experience state selection module 438, augment state selection module 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

XR experience managing module 434 can manage multiple artificial reality (XR) experiences in an augmented world environment (e.g., an XR environment) on an XR device. Each XR experience can provide one or more corresponding augments defining bounding layouts for two-dimensional (2D) and/or three-dimensional (3D) virtual objects. Bounding layouts can represent coordinates, orientation, dimensions, and location types for virtual objects overlaid onto the real world as perceived from the perspective of the user. In some implementations, one or more of the XR experiences can provide other content items relevant to the XR experience, such as audio items and/or haptics items. Further details regarding managing multiple XR experiences in an XR environment on an XR device are described herein with respect to block 502 of FIG. 5.

XR environment rendering module 436 can render the XR environment, managed by XR experience managing module 434, based on a hierarchy of multiple states. The multiple states can include multiple experience states corresponding to XR experiences in the XR environment, as well as multiple augment states corresponding to augments managed by XR experiences in the XR environment. In some implementations, the experience states can define capabilities of XR experiences. In some implementations, the experience states can include an active experience state, a foregrounded experience state, a backgrounded experience state, a not running experience state, and a closed experience state. In some implementations, the augment states can define how corresponding augments are or are not displayed in the XR environment. In some implementations, the augment states can include a focused state, a displayed state, a minimized state, an unloaded state, and a closed state. XR environment rendering module 436 can render the XR environment on the XR device by, for example, applying lighting effects to a display of the XR device to generate an XR environment overlaid on a view of a real-world environment, such as in mixed reality (MR) or augmented reality (AR). Further details regarding rendering an XR environment based on a hierarchy of multiple states are described herein with respect to block 504 of FIG. 5.

Experience state selection module 438 can cause an XR experience to transition to a particular experience state (or determine an experience state for an XR experience) based on any of a number of factors. For example, experience state selection module 438 can cause an XR experience to transition to an active experience state if one of its augments has a focused augment state (e.g., based on user interaction with one of its augments). In another example, experience state selection module 438 can cause an XR experience to transition to an active experience state upon launch of the XR experience. In still another example, experience state selection module 438 can cause an XR experience to transition to a foregrounded experience state if the XR experience is not in the active experience state, and if the XR experience has at least one corresponding augment in a displayed augment state. In still another example, experience state selection module 438 can cause an XR experience to transition to a backgrounded experience state if each of its augments is not displayed (i.e., has a minimized augment state, an unloaded augment state, or a closed augment state), but when all of its augments are not closed. In some implementations, experience state selection module 438 can cause an XR experience to transition to a not running experience state when the XR device terminates the XR experience. In some implementations, experience state selection module 438 can cause an XR experience to transition to a closed experience state when the XR experience is closed by the user (e.g., from an experience/augment manager), and/or when each of its corresponding augments has a closed augment state. Further details regarding selecting or determining a state of an XR experience are described herein with respect to FIGS. 7A-7E. Augment state selection module 440 can cause an augment corresponding to an XR experience to transition to a particular augment state, and/or can determine an augment state of an augment corresponding to an XR experience. For example, if a user interacts with an augment, augment state selection module 440 can cause the augment to transition to a focused augment state. In some implementations, if the user ceases interaction with the augment, augment state selection module 440 can cause the augment to transition to a displayed augment state. In another example, if an XR experience creates a new augment in the XR environment, augment state selection module 440 can cause its preexisting augment to transition to a minimized augment state. In still another example, if the XR device can no longer localize a focused, displayed, or minimized augment, augment state selection module 440 can cause the augment to transition to an unloaded augment state. In still another example, if a user closes the augment or its corresponding XR experience, e.g., through an experience/augment manager displayed on the XR device, augment state selection module 440 can cause the augment to transition to a closed augment state. Further details regarding selecting or determining a state of an augment are described herein with respect to FIGS. 9A-9E.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
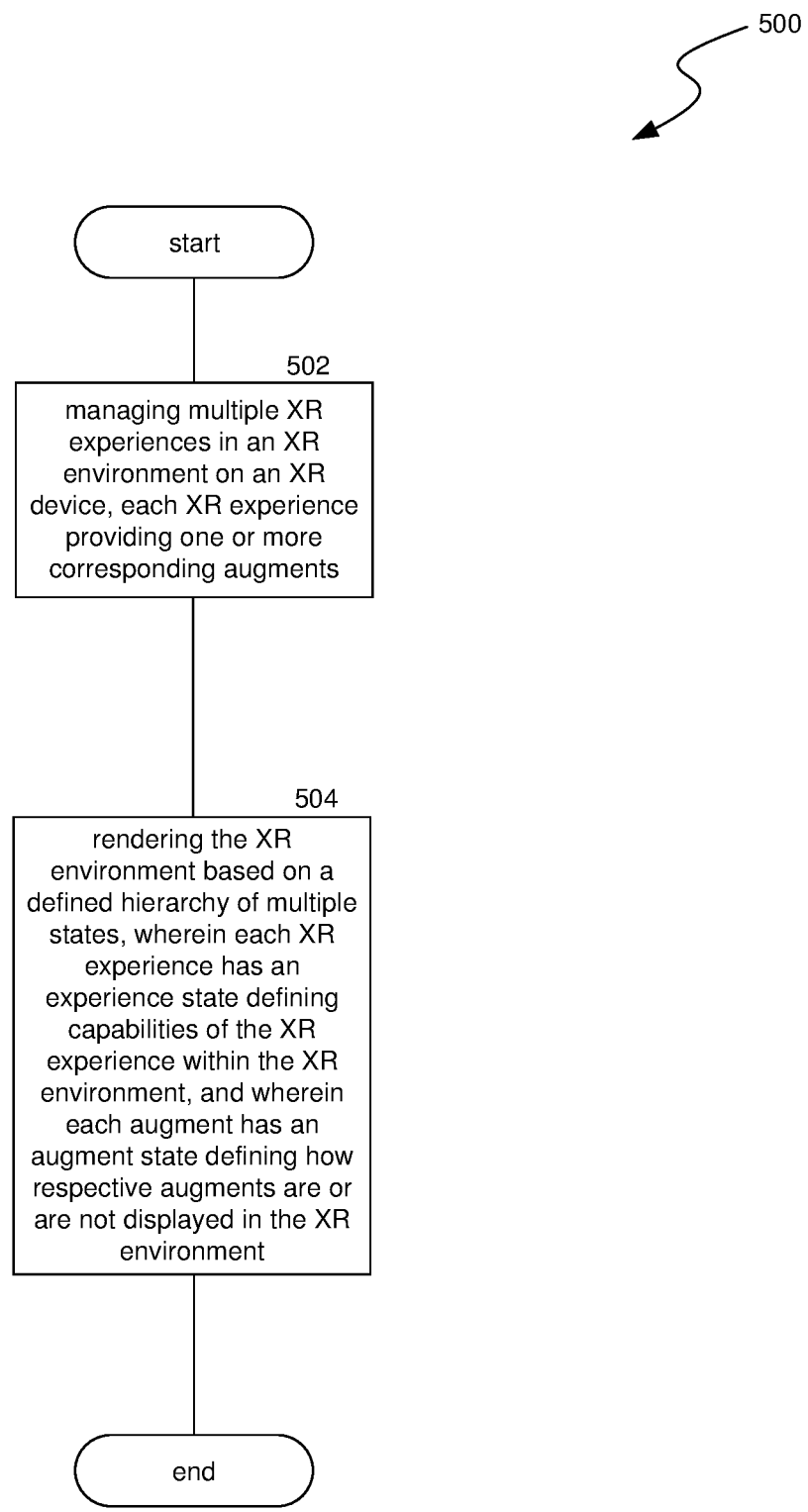
FIG. 5 is a flow diagram illustrating a process used in some implementations of the present technology for providing an augmented world environment model for an artificial reality environment.

FIG. 5 is a flow diagram illustrating a process 500 used in some implementations for providing an augmented world environment model for an artificial reality (XR) environment. In some implementations, the augmented world environment can be a general multitasking XR environment in which multiple XR experiences can be accessed. In some implementations, process 500 can be performed upon activation or donning of an XR device. In some implementations, process 500 can be performed upon launch of multiple XR experiences on an XR device. In some implementations, one or more blocks of process 500 can be performed by an XR device, such as an XR head-mounted display (HMD). In some implementations, one or more blocks of process 500 can be performed by another XR device in operable communication with an XR HMD, such as external processing components.

At block 502, process 500 can manage multiple XR experiences in the XR environment on an XR device. The XR experiences can be, for example, XR applications installed on the XR device, which can be associated with the same or different developers. Each XR experience can provide one or more corresponding augments. The augments can define bounding layouts for one or more content items, such as visual virtual objects. However, it is contemplated that XR experiences can provide other content items other than visual virtual objects, such as audio objects, haptics objects, etc. An "augment," also referred to herein as a "virtual container" is a 2D or 3D volume, in an artificial reality environment, that can include presentation data, context, and logic. An artificial reality system can use augments as the fundamental building block for displaying 2D and 3D content in the artificial reality environment. For example, augments can represent people, places, and things in an artificial reality environment and can respond to a context such as a current display mode, date or time of day, a type of surface the augment is on, a relationship to other augments, etc. A controller in the artificial reality system, sometimes referred to as a "shell," can control how artificial reality environment information is surfaced to users, what interactions can be performed, and what interactions are provided to applications. Augments can live on "surfaces" with context properties and layouts that cause the augments to be presented or act in different ways. Augments and other objects (real or virtual) can also interact with each other, where these interactions can be mediated by the shell and are controlled by rules in the augments evaluated based on contextual information from the shell.

An augment can be created by requesting the augment from the artificial reality system shell, where the request supplies a manifest specifying initial properties of the augment. The manifest can specify parameters such as an augment title, a type for the augment, display properties (size, orientation, location, eligible location type, etc.) for the augment in different display modes or contexts, context factors the augment needs to be informed of to enable display modes or invoke logic, etc. The artificial reality system can supply the augment as a volume, with the properties specified in the manifest, for the requestor to place in the artificial reality environment and write presentation data into.

Augment "presentation data" can include anything that can be output by the augment, including visual presentation data, auditory presentation data, haptic presentation data, etc. In some implementations, the presentation data is "live" such that it matches external data either by pointing to that external data or being a copy of it that is periodically updated. The presentation data can also be shared, such that a change to the external data by another user or system can be propagated to the output of the augment. For example, an augment can display live services and data while accepting interactions from users or other augments. As a more specific example, a user may select a photo shared on a social media platform to add as presentation data to an augment that is positioned on her wall. The owner of the post may modify the photo and the modified version can be shown in the augment. Additional live social media content related to the photo may also be in the augment presentation data, such as indications of "likes" or comments on the photo. The owner of the photo may also change the access rights, causing the photo to no longer display in the augment.

An augment can track a current context, based on context factors signaled to the augment by the artificial reality system. A context can include a variety of context factors such as a current mode of the artificial reality system (e.g., interactive mode, minimized mode, audio-only mode, etc.), other objects (real or virtual) in the artificial reality environment or within a threshold distance of an augment, characteristics of a current user, social graph elements related to the current user and/or artificial reality environment objects, artificial reality environment conditions (e.g., time, date, lighting, temperature, weather, graphical mapping data), surface properties, movement characteristics of the augment or of other objects, sounds, user commands, etc. As used herein an "object" can be a real or virtual object and can be an inanimate or animate object (e.g., a user). Context factors can be identified by the artificial reality system and signaled to the relevant augments. Some context factors (e.g., the current artificial reality system mode) can be automatically supplied to all augments. Other context factors can be registered to be delivered to certain augments (e.g., at creation time via the manifest or through a subsequent context factor registration call). The augment can have variables that hold context factors for which the augment has logic. All augments can inherit some of these variables from a base augment class, some of these variables can be defined in extensions of the augment class (e.g., for various pre-established augment types), or some of these variables can added to individual augments at augment creation (e.g., with the manifest) or through a later declaration. In some cases, certain context factors can be tracked by the artificial reality system, which augments can check without the artificial reality system having to push the data to individual augments. For example, the artificial reality system may maintain a time/date global variable which augments can access without the artificial reality system constantly pushing the value of that variable to the augment.

The augment's logic (defined declaratively or imperatively) can cause the augment to change its presentation data, properties, or perform other actions in response to context factors. Similarly to the variable holding context factors, the augment's logic can be specified in a base class, in an extension of the base class for augment types, or individually for the augment (e.g., in the manifest). For example, all augments can be defined to have logic to redraw themselves for different display modes, where the augment is provided different sizes or shapes of volumes to write into for the different modes. As a further example, all augments of a "person" type can have logic to provide notifications of posts by that person or incoming messages from that person. As yet another example, a specific augment can be configured with logic that responds to an area_type context factor for which the augment is registered to receive updates, where the augment responds to that context factor having an "outside" value by checking if a time context factor indicates between 6:00 am and 7:00 pm, and if so, switching to a darker display mode.

At block 504, process 500 can render the XR environment based on a hierarchy of multiple states, the multiple states including experience states and augment states. In some implementations, the defined hierarchy can be based on a set of rules that control rendering of the multiple XR experiences and the corresponding augments. Each XR experience can have an experience state, while each augment can have an augment state. In some implementations, the experience states can define capabilities of respective XR experiences. In some implementations, the experience states can include an active state, a foregrounded state, a backgrounded state, a not running state, and/or a closed experience state. In some implementations, the augment states can define how respective augments are or are not displayed. In some implementations, the augment states can include a focused state, a displayed state, a minimized state, an unloaded state, and/or a closed augment state.

In some implementations, an augment, corresponding to a particular XR experience, having a focused state as its augment state, causes the experience state for the particular artificial reality experience to transition to the active state, based on a rule of the set of rules. In some implementations, interaction, by a user of the XR device, with an augment corresponding to a particular XR experience, can cause the augment to transition to the focused state as the augment state. For example, the XR device can render various augments overlaid onto a view of a real-world environment of the user, such as in a mixed reality (MR) or augmented reality (AR) environment. The user can interact with one of the augments rendered on the XR device to cause it to enter into the focused state by, for example, making a gesture toward and/or touching a virtual location of a virtual object within the augment, selecting a virtual object within the augment using a virtual ray cast from the user's virtual hand (which can track movements of the user's physical hand) and/or from a controller (e.g., controller 276A and/or controller 276B of FIG. 2C), making an audible announcement (e.g., "Make the avatar of my virtual assistant dance!", which can be captured by one or more microphones integral with or in operable communication with the XR device, and processed using speech recognition and/or natural language processing techniques), etc. In some implementations, the user interaction can cause the augment to come into focus, and its associated experience to become active.

In some implementations, launching of an XR experience causes the XR experience to transition to the active state, and the XR experience can select one of its corresponding augments to transition to the focused state. In some implementations, process 500 can launch the XR experience in response to a user request to launch the XR experience. For example, a user can select the XR experience from a menu and/or via a virtual button corresponding to the XR experience, such as by making a gesture relative to the virtual location of a virtual object representative of the XR experience, and/or by selecting the virtual object using a virtual ray cast in the XR environment, such as via a controller (e.g., controller 276A and/or controller 276B of FIG. 2C). In another example, a user can select the XR experience by audibly announcing that he would like to launch the XR experience (e.g., "Open my XR pets experience!"), which can be captured by, e.g., one or microphones integral with or in operable communication with the XR device. In such an example, upon capturing the audible announcement, process 500 can perform speech recognition and/or natural language processing techniques to translate the announcement into a command recognizable and executable by the XR device to launch the XR experience.

In still another example, process 500 can launch the XR experience automatically, such as when process 500 detects that the XR device is in a particular physical space in a real-world environment, e.g., based on visual features of the real-world environment, based on captured and/or obtained spatial anchors for the physical space, based on captured and/or obtained scene data for the physical space, etc. In still another example, process 500 can launch the XR experience automatically based on the XR device entering a particular guardian (i.e., a defined XR usage space, which may have a boundary which can trigger warnings or other system actions if a user crosses the boundary when in an XR experience). Process 500 can launch the particular XR experience automatically based on, for example, the XR experience being the most frequently used XR experience in that physical space and/or guardian, the XR experience being last accessed within that physical space and/or guardian (in which case, in some implementations, process 500 can pick up where the user left off when last accessing the XR experience), and/or a mapping of the of the XR experience to that physical space and/or guardian (either established manually by the user or automatically by process 500, such as based on features of the physical space with respect to features of the XR experience, as described further herein). For example, upon detection of the XR device entering a physical office space, process 500 can automatically launch an XR work space experience, which can cause the XR work space experience to transition to the active state, and an augment within the XR work space experience (e.g., a virtual computer) to transition to the focused state. In some implementations, only one XR experience can have the active state, and/or only one augment can have the focused state, i.e., the XR experience in the active state can be exclusively in the active state, and/or the augment in the focused state can be exclusively in the focused state. In the above example, therefore, any other augments associated with any other experiences rendered in the physical office space (and, in some implementations, other augments associated with the same XR experience that have not been interacted with and/or that have not been selected by the XR experience to transition to the focused state) can be unfocused (e.g., have a displayed state or a minimized state). Further details regarding an active experience state are described herein with respect to FIG. 7A. Further details regarding a focused augment state are described herein with respect to FIG. 9A.

In some implementations, if an XR experience is not in the active state (e.g., has not just been launched and/or has not received a user interaction with one of its augments, i.e., does not have an augment in the focused state), but has at least one of its augments displayed (e.g., in an unfocused state), the XR experience can have a foregrounded state. When the XR experience is in the foregrounded state, the XR experience can perform any functions that are not restricted to only the active state. For example, process 500 can still render the augments of the foregrounded experience, targetable content within the augments can remain hoverable, and the foregrounded experience can continue to perform work of user value. In some implementations, an in the displayed state, corresponding to an XR experience in the foregrounded state, can be rendered with degradation (i.e., in a moderated manner) relative to a focused augment state. In some implementations, however, the at least one augment in the displayed state does not have to be rendered with degradation relative to the focused augment state. However, interaction with a displayed augment while the XR experience is in the foregrounded state can cause the augment to enter the focused state and the XR experience to enter the active state. Further details regarding a foregrounded experience state are described herein with respect to FIG. 7B. Further details regarding a displayed augment state are described herein with respect to FIG. 9B.

In some implementations, process 500 can render multiple augments having different augment states, despite each of the augments corresponding to the same XR experience. In some implementations, the XR experience can create new augments in the XR environment. In some implementations, when an XR experience creates a new augment in the XR environment, process 500 can cause one or more of the existing displayed augments corresponding to the XR experience to transition to a minimized state. In some implementations, when the XR experience creates the new augment in the XR environment, process 500 can cause all of the existing displayed augments corresponding to the XR experience to transition to a minimized state. While in the minimized states, augments can be loaded in the scene (either in or out of the field-of-view of the XR device), but can be minimized to an icon (e.g., a virtual object representative of the augment, but simpler than the full display of the augment and/or consuming less resources than a full display of the augment). However, other actions can cause an augment to transition to a minimized state as well. Further details regarding a minimized augment state are described herein with respect to FIG. 9C.

In some implementations, when an augment has a focused state, a displayed state, or a minimized state, process 500 can render the augment (or its corresponding icon when in the minimized state) with reference to one or more spatial anchors established for the real-world environment. The spatial anchors can be world-locked frames of reference that can be created at particular positions and orientations to position content items within the augments at consistent points in an XR environment. Spatial anchors can be persistent across different sessions of an XR experience, such that a user can stop and resume an XR experience, while still maintaining content at the same locations in the real-world environment.

In some implementations, the spatial anchors can be stored locally on the XR device. However, because the user can use the XR device in many different locations in the real-world environment (e.g., multiple rooms in a home, other people's homes, etc.), a large number of spatial anchors may need to be stored to consistently render content at those locations. Due to the storage constraints on an XR device, some created spatial anchors often cannot be retained locally. Thus, in some implementations, the spatial anchors can be stored on a platform computing system on a cloud. The user of the XR device (or another user on the XR device or another XR device) can use the XR device to create, capture, and/or access locally cached spatial anchors at locations in the real-world environment, then upload those spatial anchors to the platform computing system.

The platform computing system can align the uploaded spatial anchors on a localization map, query a database for preexisting spatial anchors for the real-world environment (e.g., that are proximate to the XR device), and transmit the preexisting spatial anchors back to the XR device. The XR device can then render one or more augments of the XR experience in the real-world environment using the uploaded spatial anchors and the preexisting spatial anchors, without having to itself capture and persistently store all of the spatial anchors needed to render the XR experience. Thus, some implementations can conserve storage space on an XR device. Further, by storing unnecessary or infrequently used spatial anchors on a cloud, the XR device can locally store larger amounts of data needed render the XR experience, improving latency and processing speed on the XR device.

Figure 10A:
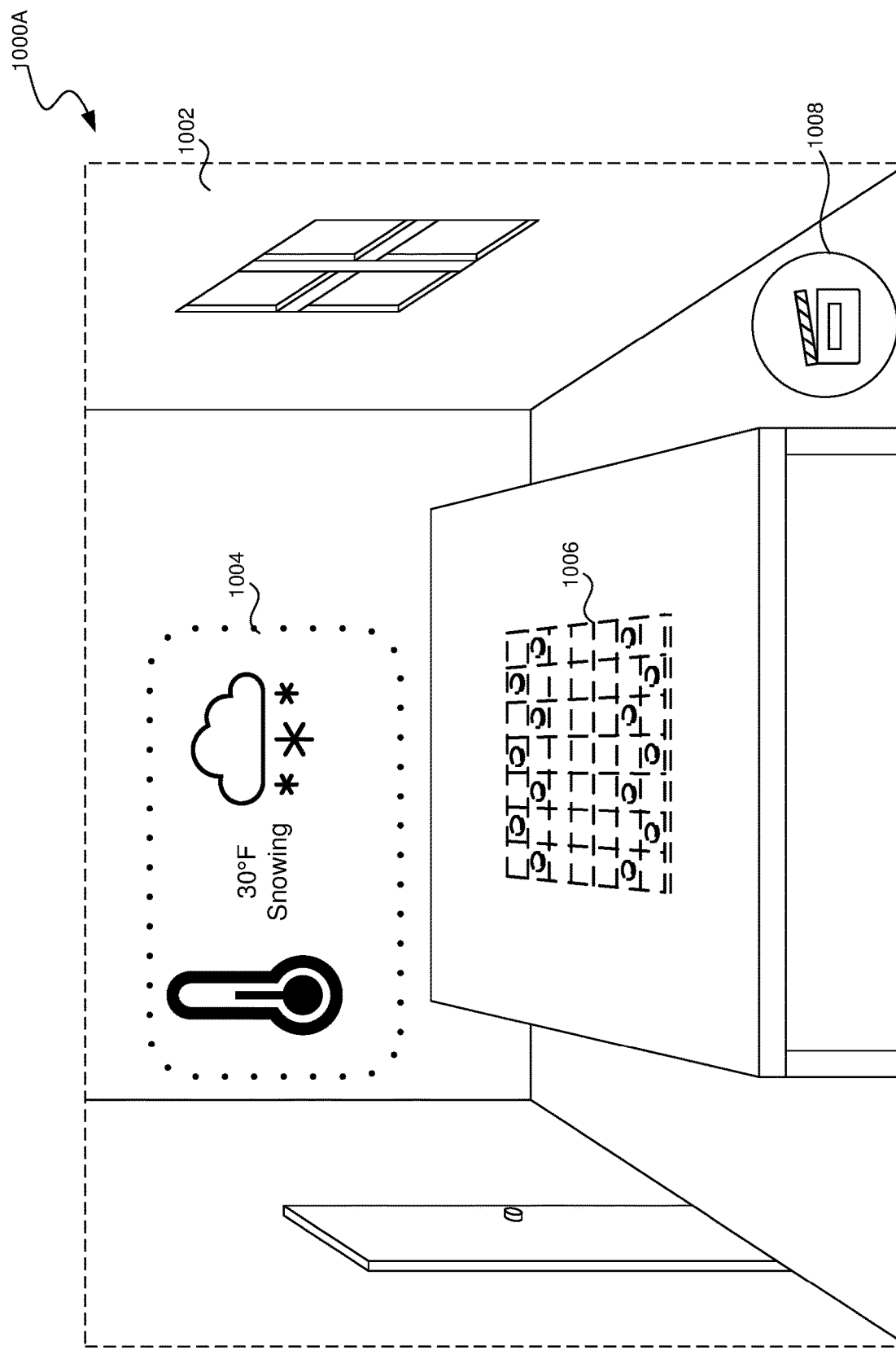
FIG. 10A is a conceptual diagram illustrating an exemplary view from an artificial reality device of augments, having various augment states according to an augmented world environment model, overlaid on a view of a real-world environment surrounding the artificial reality device.
Figure 10B:
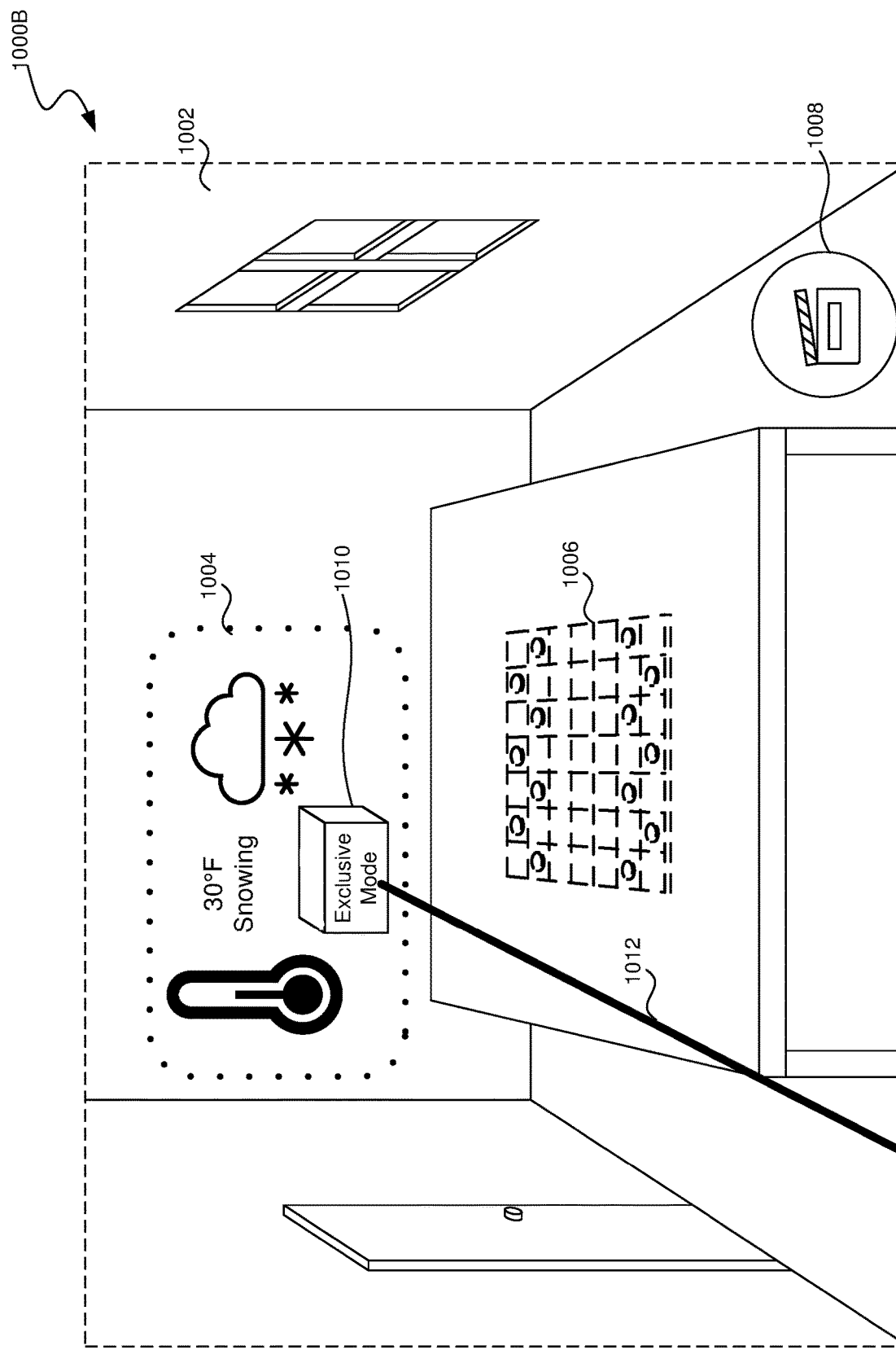
FIG. 10B is a conceptual diagram illustrating an exemplary view from an artificial reality device of an option to enter an exclusive mode, with respect to an artificial reality experience, overlaid on a view of a real-world environment surrounding the artificial reality device.

In some implementations, when an augment has a focused state, a displayed state, or a minimized state, the augment can have a corresponding virtual selectable element that can receive input to enter into an exclusive mode with respect to the corresponding XR experience, thereby removing the user from the augmented world environment, as described further herein with respect to FIG. 10B. In some implementations, process 500 can display the corresponding virtual selectable element to enter into the exclusive mode upon a certain interaction, such as hovering by a hand, controller, and/or virtual ray cast into the XR environment over a particular augment. In some implementations, an XR experience can proactively prompt the user of the XR device to enter into the exclusive mode. When in the exclusive mode, process 500 can render only the corresponding XR experience in the XR environment (i.e., exclusively render the corresponding XR experience), without rendering any augments associated with any other XR experiences. Entering the exclusive mode can remove the user of the XR device from the augmented world environment, allowing the user to focus instead on the selected XR experience. In exclusive mode, the XR experience can position content within the XR environment without consideration of other experiences and potential augments. Further, rules that the augmented world environment enforces to facilitate a spatial multi-tasking environment can be relaxed for the XR experience in exclusive mode. In addition, the XR experience in exclusive mode is the active experience, so input does not need to be directed through augments to define active experiences. In some implementations, within exclusive mode, an XR experience can display a menu or other set of one or more options with respect to the exclusive mode, including an option to exit the exclusive mode, and return to the augmented world environment. Further details regarding rendering of an exclusive mode are described herein with respect to FIG. 10B.

In some implementations, when all of the augments corresponding to an XR experience are not displayed, but an XR experience is performing work of user value, the XR experience can have a backgrounded state. When in the backgrounded state, the XR experience can continue to perform work of user value (e.g., playing music, downloading a file, tracking location, etc., which can also be performed by XR experiences in the active or foregrounded state), even though none of its augments are being displayed. Further details regarding a backgrounded experience state are described herein with respect to FIG. 7C.

Augments that are not displayed can have, for example, a minimized state as described above, an unloaded state, or a closed state. In some implementations, the virtual representation of the XR device being a threshold distance away from an augment can cause the augment to transition to the unloaded state. For example, an augment can have the unloaded state when the XR device can no longer localize the augment, e.g., due to the user leaving a physical space (e.g., a room) in which the augment is localized. In some implementations, the XR device can no longer localize the augment because the XR device moved outside a guardian where the XR experience can be accessed. In some implementations, the XR device can no longer localize the augment because the XR device no longer has access to one or more spatial anchors referenced by the augment. Further details regarding an unloaded augment state are described herein with respect to FIG. 9D.

In some implementations, an XR experience can have a not running experience state. In some implementations, the XR experience can have the not running experience state when it is not executing, and thus has no open augments. In some implementations, the XR experience can have the not running experience state when process 500 terminates the XR experience. When in the not running experience state, the XR experience can have no capabilities, e.g., unlike in the active, foregrounded, and backgrounded states, the XR experience cannot perform work of user value. Further details regarding a not running experience state are described herein with respect to FIG. 7D.

An augment can have a closed augment state when the augment no longer exists (i.e., it has been deleted from an augment graph and is no longer present in the scene). For example, an augment can have a closed augment state when a user selects to close the augment from an experience/augment manager displayed on the XR device. In another example, an augment can have a closed augment state when an XR experience having an active experience state chooses to close its augment. In still another example, an augment can have a closed augment state when an orchestrating experience (e.g., an experience managing rendering of augments corresponding to one or more open XR experiences) closes the augment. In some implementations, the XR experience and/or the orchestrating experience can close an augment based on one or more constraints, the constraints being either system-level (i.e., established by a platform associated with the XR device) or developer-defined (i.e., established by a developer of a respective XR experience and/or its particular rendering framework). For example, the constraints can include one or more of a size of the augment, a size of the augment that is allocated to a particular content item, the size of the augment that is allocated to the XR experience relative to the size of augments allocated to the one or more other XR experiences, how the content items and/or augments associated with the same or different XR experiences can interact with each other, how the content items and/or augments are positioned with respect to other content items and/or augments associated with the same or different XR experiences, or any combination thereof. Further details regarding a closed augment state are described herein with respect to FIG. 9E.

In some implementations, when all of the augments corresponding to an XR experience are in a closed augment state, the XR experience can have a closed experience state. In some implementations, when the XR experience is closed by a user of the XR device (e.g., from an experience/augment manager displayed on the XR device), the XR experience can have a closed experience state. An XR experience in a closed experience state can be closed from the perspective of the user of the XR device. From the closed experience state, the user of the XR device can launch the XR experience, causing the XR experience to transition to an active experience state. Further details regarding a closed experience state are described herein with respect to FIG. 7E.

Figure 6:
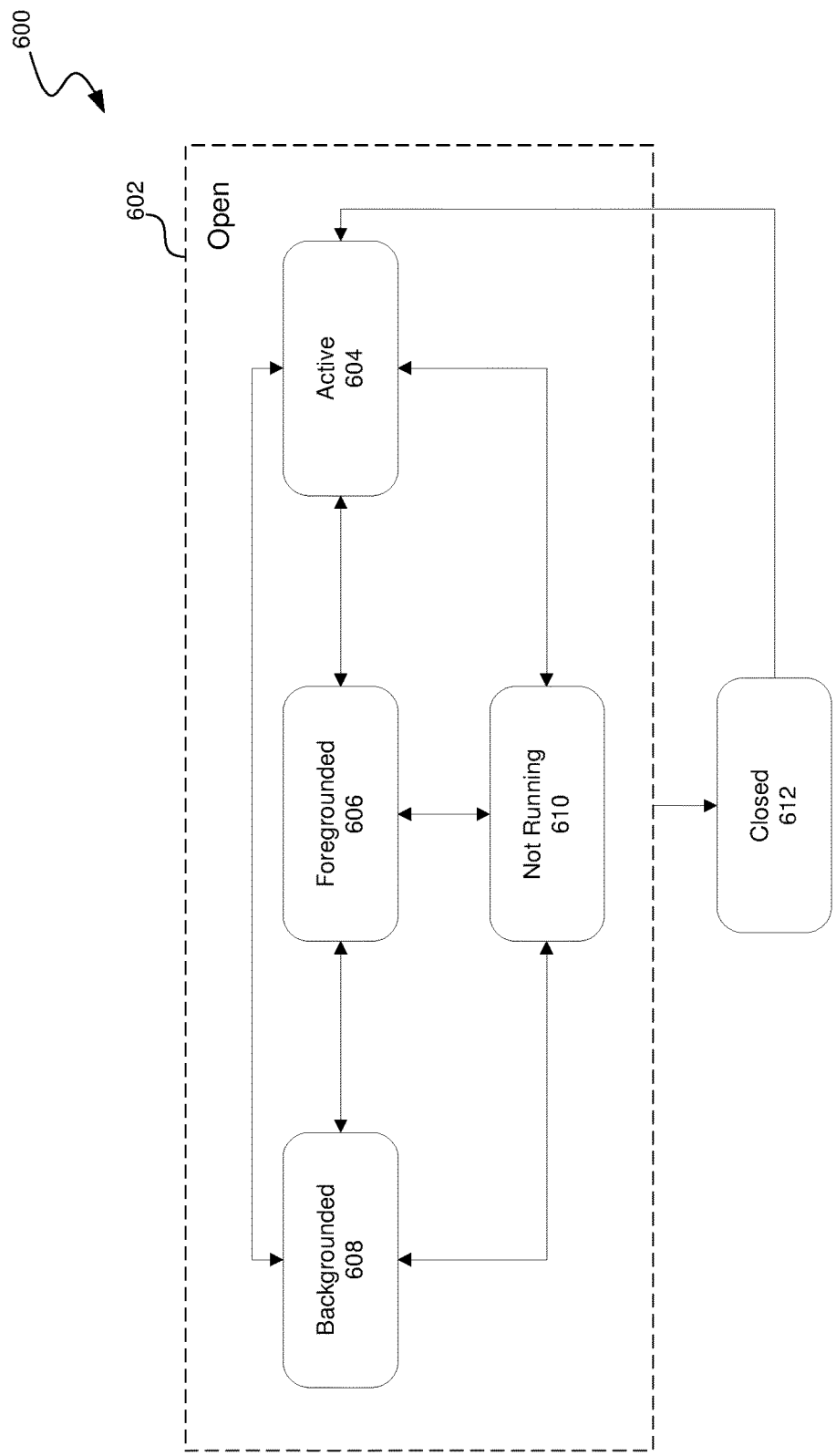
FIG. 6 is a block diagram illustrating a lifecycle of experience states for an artificial reality experience in an augmented world environment model.

FIG. 6 is a block diagram illustrating a lifecycle 600 of experience states for an XR experience in an augmented world environment model. The experience states can include open experience states 602 and closed experience state 612. Open experience states 602 can include active state 604, foregrounded state 606, backgrounded state 608, and not running state 610. An XR experience can move from "open" or "closed" states from the perspective of a user of an XR device in which the augmented world environment is modeled, while moving through foregrounded state 606, backgrounded state 608, and not running state 610 can be observed from a system- and developer-level perspective.

Open experience states 602 can transition amongst themselves based on various factors, as described further herein with respect to FIGS. 7A-7D. Open experience states 602 can further transition into closed experience state 612, and closed experience state 612 can transition into active state 604, as described further herein with respect to FIG. 7E. By transitioning between states, lifecycle 600 can provide resource management. For example, XR experiences can receive varying resources (e.g., processing power and memory) as they move between states. Lifecycle 600 can further provide capability management, such that an XR experience having active state 604 can have privileges and capabilities not provided to the other states. For example, a single XR experience having active state 604 can have unique capabilities and resource priority. Other XR experiences can be visible in foregrounded state 606 (or invisible and in backgrounded state 608), but can have fewer resources and capabilities. For example, XR experiences in active state 604 can be allocated more rendering resources than XR experiences in the backgrounded state. In some implementations, lifecycle 600 can increase a user's feeling of control by allowing only one XR experience to modify the user's augmented world environment without direct user action. Thus, a user can more readily understand which XR experience has taken an action, such as by spontaneously creating or closing an augment. Active state 604 is described further herein with respect to FIG. 7A. Foregrounded state 606 is described further herein with respect to FIG. 7B. Backgrounded state 608 is described further herein with respect to FIG. 7C. Not running state 610 is described further herein with respect to FIG. 7D. Closed experience state 612 is described further herein with respect to FIG. 7E.

Figure 7A:
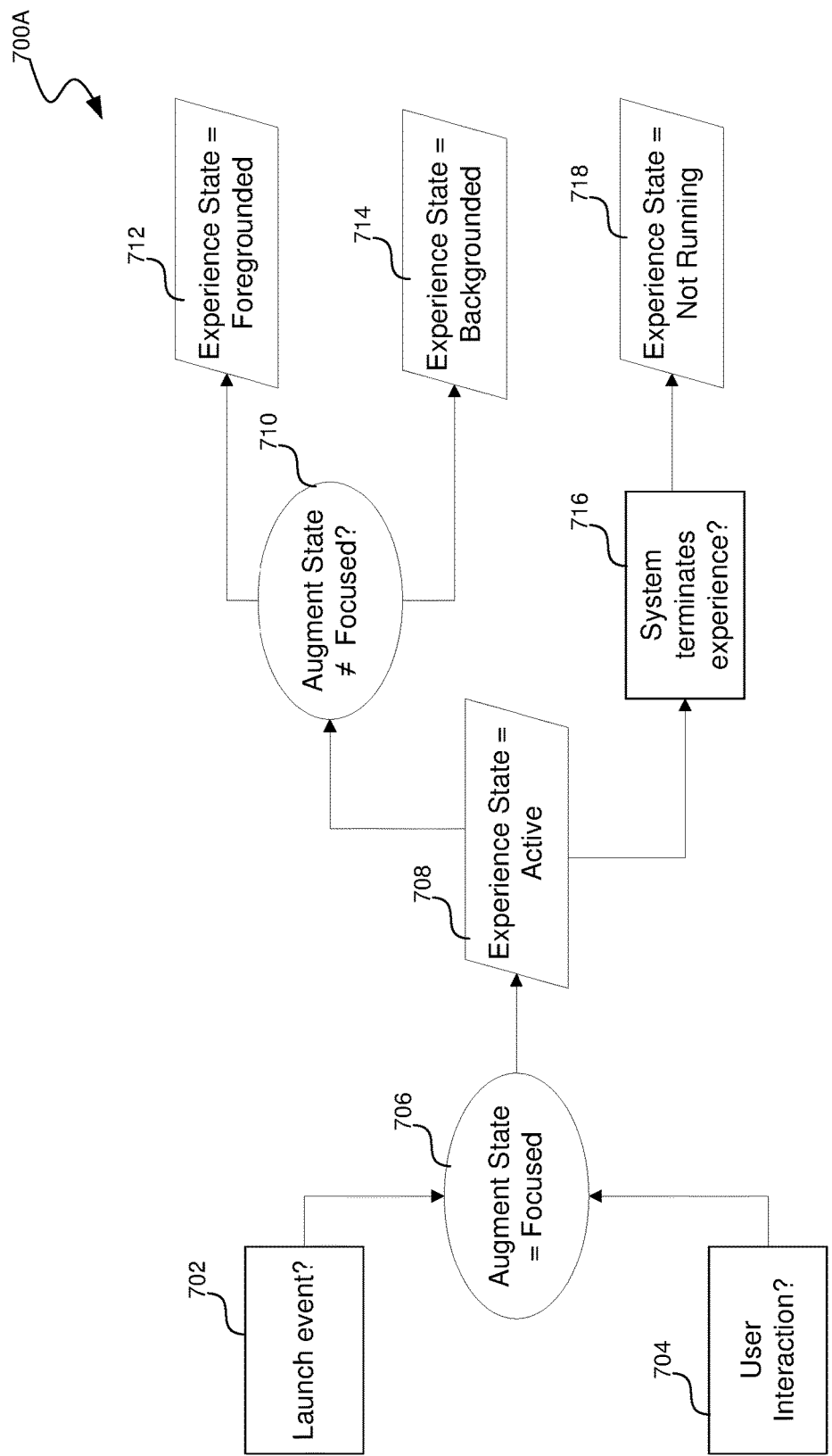
FIG. 7A is a flow diagram illustrating a process used in some implementations for entering and exiting an active experience state according to an augmented world environment model.

FIG. 7A is a flow diagram illustrating a process 700A used in some implementations for entering and exiting an active experience state according to an augmented world environment model. In some implementations, process 700A can be performed upon receipt of a launch event at block 702, and/or upon interaction with an augment rendered on an XR device at block 704. In some implementations, one or more blocks of process 700A can be performed by an XR device, such as an XR head-mounted display (HMD) (e.g., XR HMD 200 of FIG. 2A and/or XR HMD 252 of FIG. 2B). In some implementations, one or more blocks of process 700A can be performed by another XR device in an XR system in operable communication with an XR HMD, such as external processing components.

At block 702, process 700A can determine whether a launch event has occurred. In some implementations, the launch event can be, for example, a user selection of the XR experience from a virtual menu or launcher, a user selecting or entering a virtual portal associated with the XR experience, etc. In some implementations, the launch event can be an automatic launch of the XR experience, e.g., by a user of the XR device entering a particular physical space or guardian, by a user activating and/or donning the XR device, etc. In some implementations, the launch event can be based on the user following a deep link to the XR experience, such as, for example, a user "clicking" on a notification from an XR experience. Upon launch of the XR experience, the XR experience can select one of its augments to bring into focus at block 706, as is described further herein with respect to block 906 of FIG. 9A.

Alternatively, at block 704, process 700A can receive a user interaction with an augment corresponding to an XR experience. The user interaction can be an engagement interaction, such as, for example, touching of or hovering over a virtual object within an augment with the user's virtual hand (which can be tracking movements of the user's physical hand), touching of or hovering over the virtual object with a virtual ray cast from the user's virtual hand and/or a controller (e.g., controller 276A and/or controller 276B of FIG. 2C), a selection of a physical button when the virtual ray cast from the controller is hovering over the virtual object, etc. In some implementations, the engagement interaction can provide intent of the user to interact with the augment, without a "physical" interaction occurring between the user and the augment. For example, in some implementations, the user interaction can alternatively or additionally include the user's gaze direction being at an augment or a particular virtual object within an augment, which, in some implementations, can be captured by one or more cameras integral with the XR device and facing the user. Upon receipt of the user interaction with an augment at block 704, that augment can be brought into a focused state at block 706.

In some implementations, the augment can be in the focused state at block 706 regardless of whether the augment is inside or outside the field-of-view of the XR device. For example, at block 704, the user can interact with a virtual object within an augment being rendered on the XR device, but can then move the XR device (e.g., by moving her head), such that the virtual object and/or the augment is no longer in the field-of-view of the user. However, in some implementations, the augment that the user interacted with at block 704 can remain in the focused state, unless or until another XR experience is launched at block 702, or a user interaction with a different augment is received at block 704. In some implementations, only one augment, of all of the augments for all of the XR experiences being accessed on the XR device, can have the focused state.

When the augment state is focused at block 706, the corresponding XR experience hosting the augment can be brought into an active state at block 708. Although illustrated as block 706 occurring prior to block 708, however, it is contemplated that block 708 can be performed prior to block 706, and/or that blocks 706 and 708 can be performed concurrently or simultaneously. The XR experience having the active state can be the XR experience that owns the currently focused augment. In some implementations, only one XR experience can have the active state at a time. In some implementations, the XR experience having the active state can have unique capabilities, such as closing augments, creating augments, manipulating augments, moving augments from body-leashed to world-locked, etc. In some implementations, such capabilities can be withheld from XR experiences in other experience states, such as the foregrounded state, the backgrounded state, etc.

Blocks 710-718 describe processes by which an XR experience can move from an active state to another experience state. In some implementations, if, at block 710, the augment state for the focused augment changes to any other augment state (e.g., as described herein with respect to FIG. 9A), then either block 712 or block 714 can occur based on particular criteria, as described further herein with respect to FIGS. 7B and 7C. For example, at block 712, the XR experience can have a foregrounded experience state, or at block 714, the XR experience can have a backgrounded experience state. In some implementations, if, at block 716, the XR device terminates the XR experience, the XR experience can have a not running experience state at block 718, as is described further herein with respect to FIG. 7D.

Figure 7B:
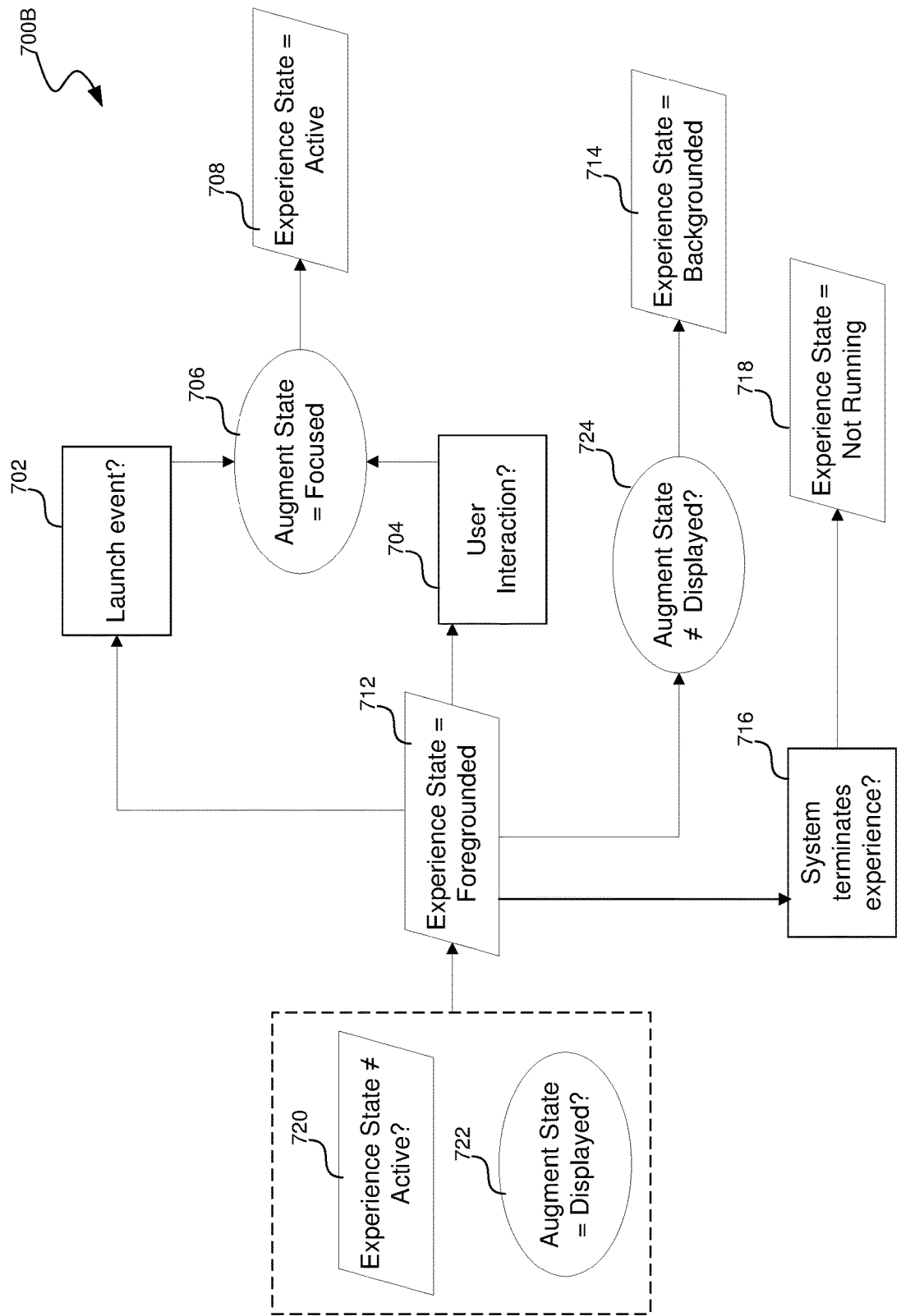
FIG. 7B is a flow diagram illustrating a process used in some implementations for entering and exiting a foregrounded experience state according to an augmented world environment model.

FIG. 7B is a flow diagram illustrating a process 700B used in some implementations for entering and exiting a foregrounded experience state according to an augmented world environment model. In some implementations, process 700B can be performed when an XR experience does not have an active state, but has one or more augments having a displayed state. In some implementations, one or more blocks of process 700B can be performed by an XR device, such as an XR head-mounted display (HMD) (e.g., XR HMD 200 of FIG. 2A and/or XR HMD 252 of FIG. 2B). In some implementations, one or more blocks of process 700B can be performed by another XR device in an XR system in operable communication with an XR HMD, such as external processing components.

An XR experience can have the foregrounded experience state at block 712 when its experience state is not the active experience state at block 720, and when at least one augment corresponding to the XR experience has a displayed augment state. Further details regarding a displayed augment state are described herein with respect to FIG. 9B. While in the foregrounded state at block 712, the XR experience can have any capabilities that are not restricted to only active XR experiences. For example, foregrounded XR experiences can still render to their relevant augments and targetable content can remain hoverable. Further, foregrounded XR experiences can perform work of user value, such as playing music, downloading files, tracking location, etc.

The XR experience having the foregrounded experience state at block 712 can move to another experience state by any of a number of methods. For example, if the XR experience receives a launch event at block 702, or an augment corresponding to the XR experience receives a user interaction at block 706, a selected or corresponding augment can enter a focused augment state at block 706, and the XR experience can enter the active experience state at block 708, as described further herein with respect to FIG. 7A. In another example, if the XR experience no longer owns at least one augment that has a displayed augment state at block 724, then the XR experience can enter into the backgrounded experience state at block 714, as is described further herein with respect to FIG. 7C. In still another example, if the XR device terminates the XR experience at block 716, then the XR experience can enter into the not running experience state, as is described further herein with respect to FIG. 7D.

Figure 7C:
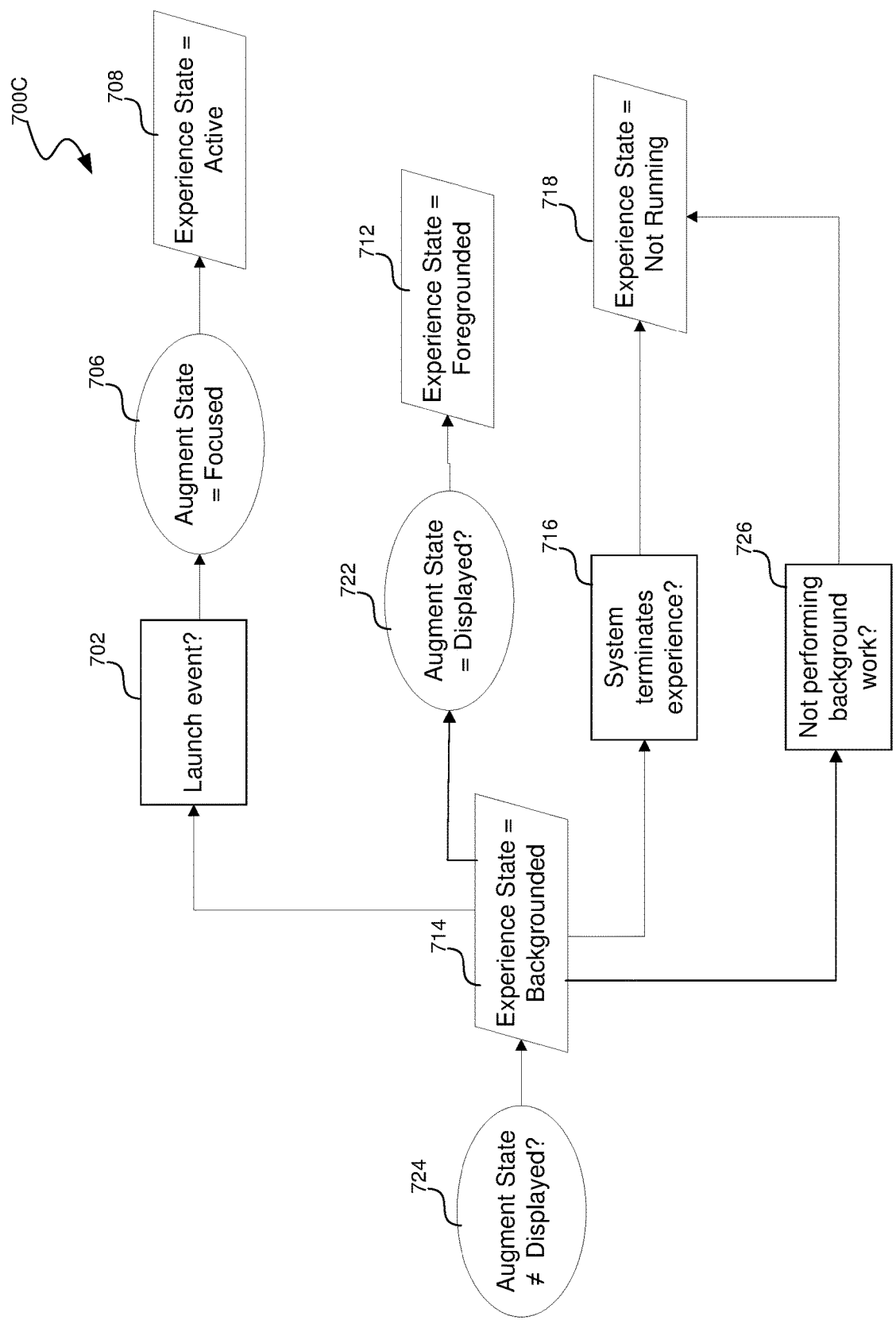
FIG. 7C is a flow diagram illustrating a process used in some implementations for entering and exiting a backgrounded experience state according to an augmented world environment model.

FIG. 7C is a flow diagram illustrating a process 7000 used in some implementations for entering and exiting a backgrounded experience state according to an augmented world environment model. In some implementations, process 7000 can be performed when an XR experience has no augments that are in a displayed state, i.e., only has augments in a not displayed state (e.g., a minimized augment state, an unloaded augment state, or a closed augment date). In some implementations, one or more blocks of process 7000 can be performed by an XR device, such as an XR head-mounted display (HMD) (e.g., XR HMD 200 of FIG. 2A and/or XR HMD 252 of FIG. 2B). In some implementations, one or more blocks of process 7000 can be performed by another XR device in an XR system in operable communication with an XR HMD, such as external processing components.

If, at block 724, an XR experience has no augments that are in a displayed state, the XR experience can be in a backgrounded experience state at block 714. An XR experience in a backgrounded experience state at block 714 can be an XR experience with no displayed augments that may be performing work of user value. When in the backgrounded experience state at block 714, the XR experience can do anything that an XR experience in a foregrounded experience state can do. While backgrounded, the XR experience will likely do background work such as playing music, downloading files, tracking location, etc.

The XR experience having the backgrounded experience state at block 714 can move to another experience state by any of a number of methods. For example, if the XR experience receives a launch event at block 702, a selected augment can enter a focused augment state at block 706, and the XR experience can enter the active experience state at block 708, as described further herein with respect to FIG. 7A. In another example, if one or more augments enters a displayed augment state at block 722, the XR experience can have the foregrounded experience state at block 712. Further details regarding a foregrounded experience state are described herein with respect to FIG. 7B. Further details regarding a displayed augment state are described herein with respect to FIG. 9B. In still another example, if the XR device terminates the XR experience at block 716, then the XR experience can enter into the not running experience state. In addition, if the XR experience stops performing background work at block 726, then the XR experience can similarly enter into the not running experience state. Further details regarding a not running experience state are described herein with respect to FIG. 7D.

Figure 7D:
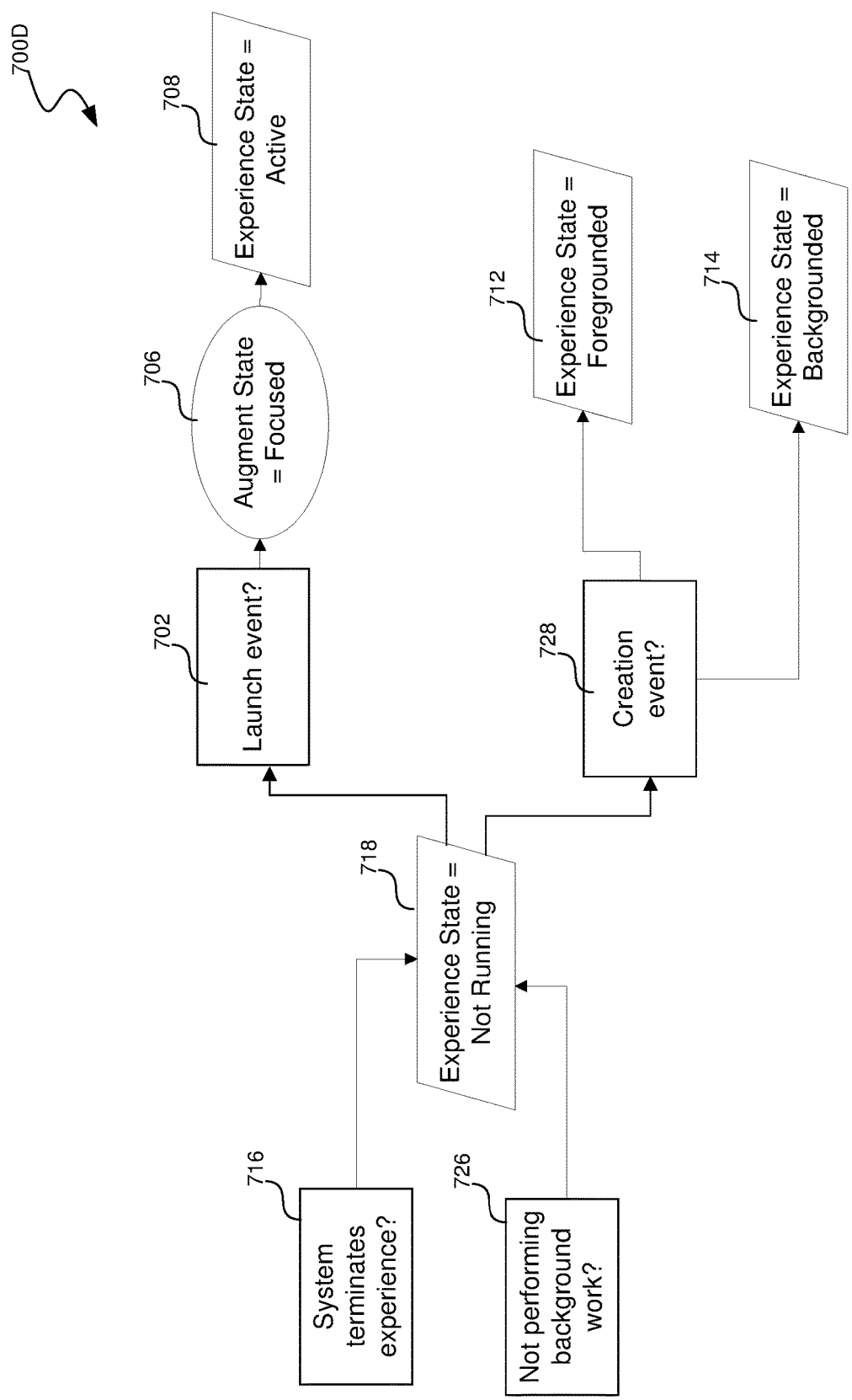
FIG. 7D is a flow diagram illustrating a process used in some implementations for entering and exiting a not running experience state according to an augmented world environment model.

FIG. 7D is a flow diagram illustrating a process 700D used in some implementations for entering and exiting a not running experience state according to an augmented world environment model. In some implementations, process 700D can be performed when an XR device terminates an XR experience at block 716, or when an XR experience stops performing background work at block 726. In some implementations, one or more blocks of process 700D can be performed by an XR device, such as an XR head-mounted display (HMD) (e.g., XR HMD 200 of FIG. 2A and/or XR HMD 252 of FIG. 2B). In some implementations, one or more blocks of process 700D can be performed by another XR device in an XR system in operable communication with an XR HMD, such as external processing components.

In some implementations, an XR experience can have a not running experience state at block 718 when an XR device terminates the XR experience at block 716. In some implementations, an XR experience can have a not running experience state at block 718 when an XR device stops performing background work at block 726, i.e., is not performing work of user value, such as not playing music, not downloading files, not tracking location, etc. While in the not running experience state at block 718, the XR experience is not executing.

The XR experience having the not running state at block 718 can move to another experience state by any of a number of methods. For example, if the XR experience receives a launch event at block 702, a selected augment can enter a focused augment state at block 706, and the XR experience can enter the active experience state at block 708, as described further herein with respect to FIG. 7A. In another example, if a creation event takes place at block 728, the XR experience can enter either a foregrounded experience state at block 712 or a backgrounded experience state at block 714. The creation event received at block 728 can be a system-level creation of the XR experience by the XR device.

Figure 7E:
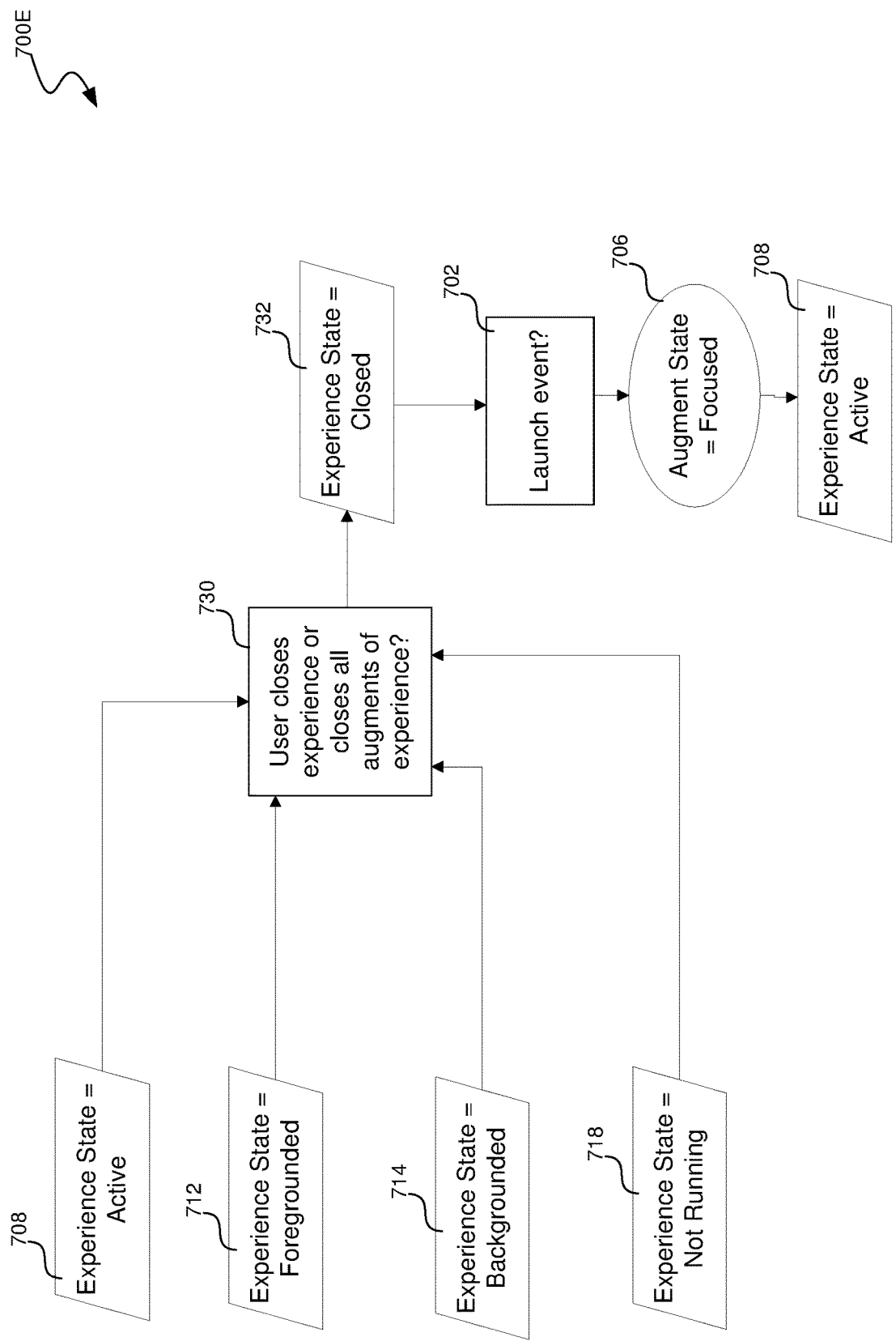
FIG. 7E is a flow diagram illustrating a process used in some implementations for entering and exiting a closed experience state according to an augmented world environment model.

FIG. 7E is a flow diagram illustrating a process 700E used in some implementations for entering and exiting a closed experience state according to an augmented world environment model. In some implementations, process 700E can be performed when a user closes an XR experience or closes all augments corresponding to an XR experience at block 730. In some implementations, one or more blocks of process 700E can be performed by an XR device, such as an XR head-mounted display (HMD) (e.g., XR HMD 200 of FIG. 2A and/or XR HMD 252 of FIG. 2B). In some implementations, one or more blocks of process 700E can be performed by another XR device in an XR system in operable communication with an XR HMD, such as external processing components.

In some implementations, from an XR experience having an active experience state at block 708, a foregrounded experience state at block 712, a backgrounded experience state at block 714, or a not running experience state at block 718, a user can close the XR experience at block 730, and the XR experience will enter a closed experience state at block 732. Alternatively, from an XR experience having an active experience state at block 708, a foregrounded experience state at block 712, a backgrounded experience state at block 714, or a not running experience state at block 718, a user can close all augments corresponding to an XR experience (i.e., all augments of the XR experience enter into a closed augment state), and the XR experience will enter a closed experience state at block 732.

The XR experience will remain in a closed experience state at block 732 unless or until a launch event occurs at block 702. If a launch event occurs at block 702, an augment corresponding to the XR experience will enter a focused augment state at block 706. Further, the XR experience will enter an active experience state at block 708. Further details regarding a focused augment state are described herein with respect to FIG. 9A. Further details regarding an active experience state are described herein with respect to FIG. 7A.

Figure 8:
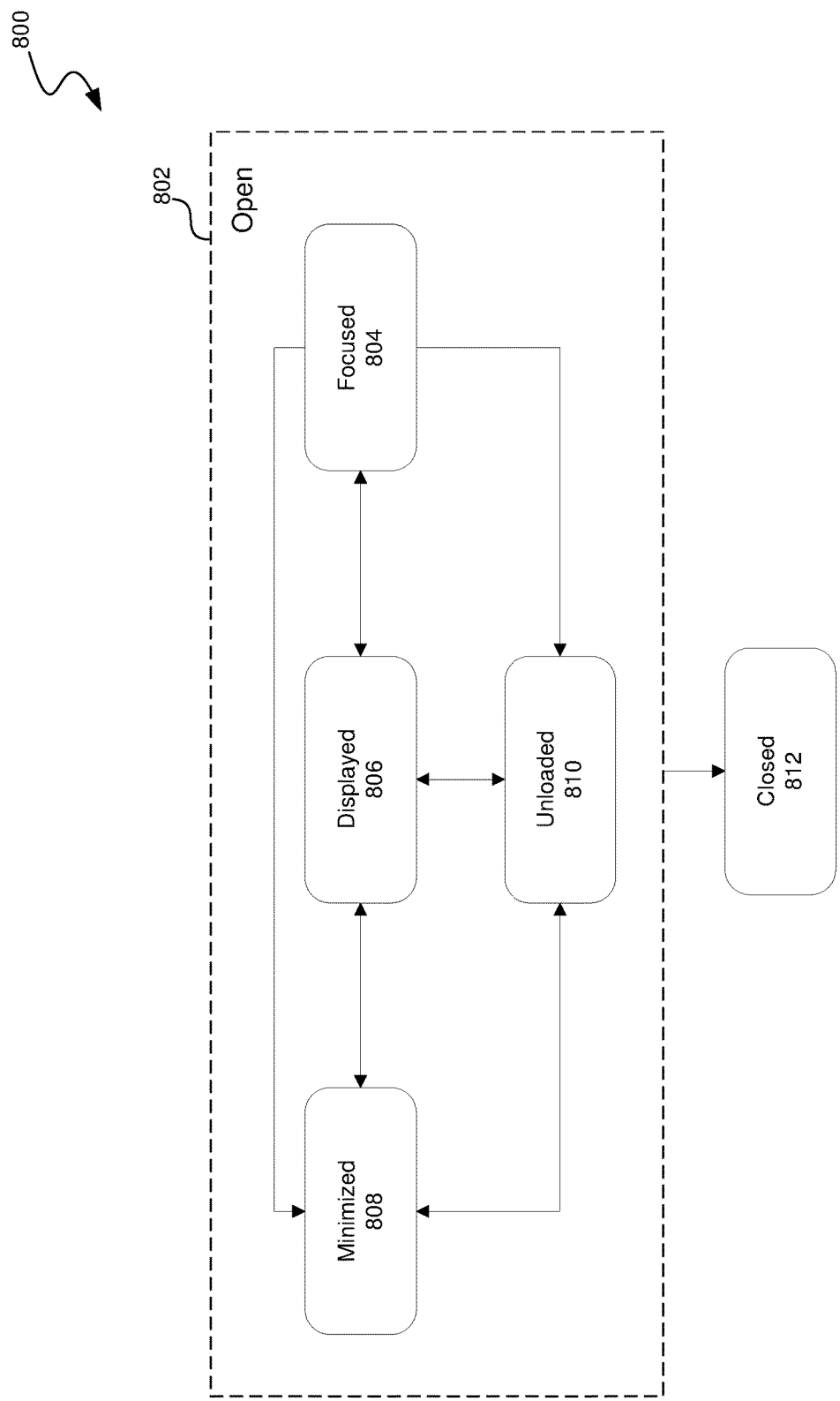
FIG. 8 is a block diagram illustrating a lifecycle of augment states for augments of artificial reality experiences in an augmented world environment model.

FIG. 8 is a block diagram illustrating a lifecycle 800 of augment states for augments of XR experiences in an augmented world environment model. The augment states can include open augment states 802 and closed augment state 812. Open augment states 802 can include focused augment state 804, displayed augment state 806, minimized augment state 808, and unloaded augment state 810. An augment having one of open augment states 802 can be an augment that exists, whether it is minimized or not, and can be listed in an experience/augment manager of the augmented world environment in some implementations. Any of open augment states 802 can map to any non-closed experience state of an XR experience. An augment having closed augment state 812 can be an augment that does not exist, e.g., due to a user closing the augment in an experience/augment manager, thereby removing it from the scene. Closed augment state 812 can map to a closed experience state of an XR experience.

Focused augment state 804 can transition to any other open augment state 802, as well as to closed augment state 812. Further details regarding focused augment state 804 are described herein with respect to FIG. 9A. Displayed augment state 806 can transition to any other open augment state 802, as well as to closed augment state 812. Further details regarding displayed augment state 806 are described herein with respect to FIG. 9B. Minimized augment state 808 can transition to displayed augment state 806, unloaded augment state 810, or closed augment state 812. Further details regarding minimized augment state 808 are described herein with respect to FIG. 9C. Unloaded augment state 810 can transition to any other open augment state 802, as well as to closed augment state 812.

Figure 9A:
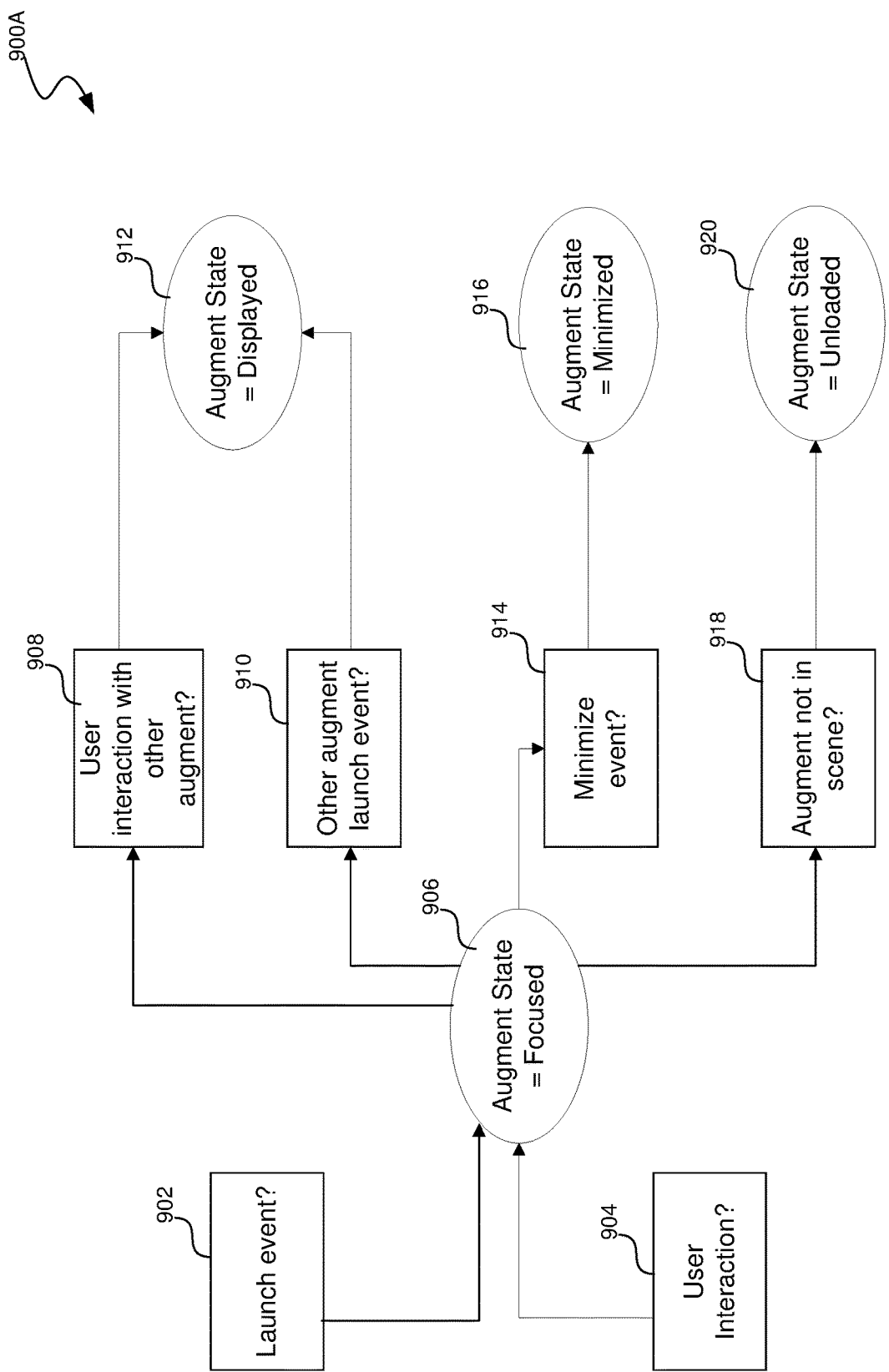
FIG. 9A is a flow diagram illustrating a process used in some implementations for entering and exiting a focused augment state according to an augmented world environment model.

FIG. 9A is a flow diagram illustrating a process 900A used in some implementations for entering and exiting a focused augment state according to an augmented world environment model. In some implementations, process 900A can be performed upon detection of a launch event with respect to an XR experience at block 902, and/or upon detection of an interaction with an augment rendered on an XR device at block 904. In some implementations, one or more blocks of process 900A can be performed by an XR device, such as an XR head-mounted display (HMD) (e.g., XR HMD 200 of FIG. 2A and/or XR HMD 252 of FIG. 2B). In some implementations, one or more blocks of process 900A can be performed by another XR device in an XR system in operable communication with an XR HMD, such as external processing components.

At block 902, process 900A can determine whether a launch event has occurred with respect to an XR experience. Process 900A can determine whether a launch event has occurred with respect to an XR experience similarly to that described with respect to block 702 of process 700A of FIG. 7A herein. If process 900A determines that a launch event has occurred with respect to the XR experience, the XR experience can select one of its augments to bring into focus at block 906. The XR experience can select which augment to bring into focus based on any criteria, such as the augment last displayed when the XR experience was previously accessed, the augment most frequently interacted with by the user when the XR experience was previously accessed, the most popular augment associated with the XR experience with respect to multiple users of the XR experience, etc. In some implementations, the XR experience can select which augment to bring into focus based on features of the augment with respect to features of the user (e.g., demographics of the user, habits of the user, etc.), with respect to features of the real-world environment (i.e., where the XR device was located when the user launched the XR experience, scene data and/or visual features of the real-world environment for the location of the XR device when the user launched the XR experience, guardian data established for the real-world environment, etc.), contextual data (e.g., time of day, time of year, season, environmental conditions such as temperature, etc.), and/or the like. For example, if a user launches an XR cooking experience over a boiling pot in the kitchen, the XR cooking experience can bring into focus an augment including a virtual timer. In another example, if the user launches an XR cooking experience while sitting on the couch, the XR cooking experience can bring into focus an augment including a virtual cookbook, instead of the augment with the virtual timer. In still another example, if the user launches an XR home experience, the XR home experience can bring an augment having a virtual book into focus when launched in a bedroom at night based on visual features of the bedroom (e.g., ambient light, a bed recognized by object recognition, etc.), while the XR home experience can bring an augment having a virtual television in focus when launched from a guardian corresponding to a couch at night.

At block 904, process 900A can determine whether a user interaction has occurred with an augment corresponding to an XR experience. Process 900A can determine whether a user interaction has occurred with an augment corresponding to an XR experience similarly to that described with respect to block 704 of process 700A of FIG. 7A. Upon determining that a user interaction has occurred with respect to an augment corresponding to an XR experience at block 904, that augment can be brought into a focused state at block 906.

In some implementations, the augment can be in the focused state at block 906 regardless of whether the augment is inside or outside the field-of-view of the XR device. For example, at block 906, the user can interact with a virtual object within an augment being rendered on the XR device, but can then move the XR device (e.g., by moving her head), such that the virtual object and/or the augment is no longer in the field-of-view of the user. In some implementations, only one augment, of all of the augments for all of the XR experiences being accessed on the XR device, can have the focused state.

In some implementations, the augment that the user interacted with at block 904 can remain in the focused state at block 906, unless or until an event is detected relative to blocks 908, 910, 914, or 918, unless or until the augment is closed, or unless or until the XR device is removed and/or deactivated. At block 908, process 900A can determine whether a user interaction has been detected with respect to another augment. In some implementations, the other augment can be another augment corresponding to the same XR experience, or can be another augment corresponding to a different XR experience. If a user interaction is detected with respect to another augment at block 908, process 900A can change the augment state to a displayed augment state at block 912. At block 910, process 900A can determine whether there is another augment launch event, e.g., an XR experience chooses to bring a different augment into focus. If process 900A determines that there is another augment launch event, process 900A can change the augment state to a displayed augment state at block 912. In other words, if another augment goes into a focused augment state, process 900A can change the augment state to a displayed augment state. Further details regarding a displayed augment state are described herein with respect to FIG. 9B.

At block 914, process 900A can determine whether a minimize event has occurred. If process 900A determines that a minimize event has occurred at block 914, process 900A can change the augment state to a minimized augment state at block 916. In some implementations, the minimize event can be a user minimization of the augment to an icon in order to clear the user's field-of-view, or to create space in the augmented world environment. Further details regarding a minimized augment state are described herein with respect to FIG. 9C.

At block 918, process 900A can determine whether the augment is not in the scene. If process 900A determines that the augment is not in the scene at block 918, process 900A can change the augment state to an unloaded augment state at block 920. Once in an unloaded augment state, the corresponding XR experience will not be doing any work or consuming any resources for the augment. Further details regarding an unloaded augment state are described herein with respect to FIG. 9D.

Figure 9B:
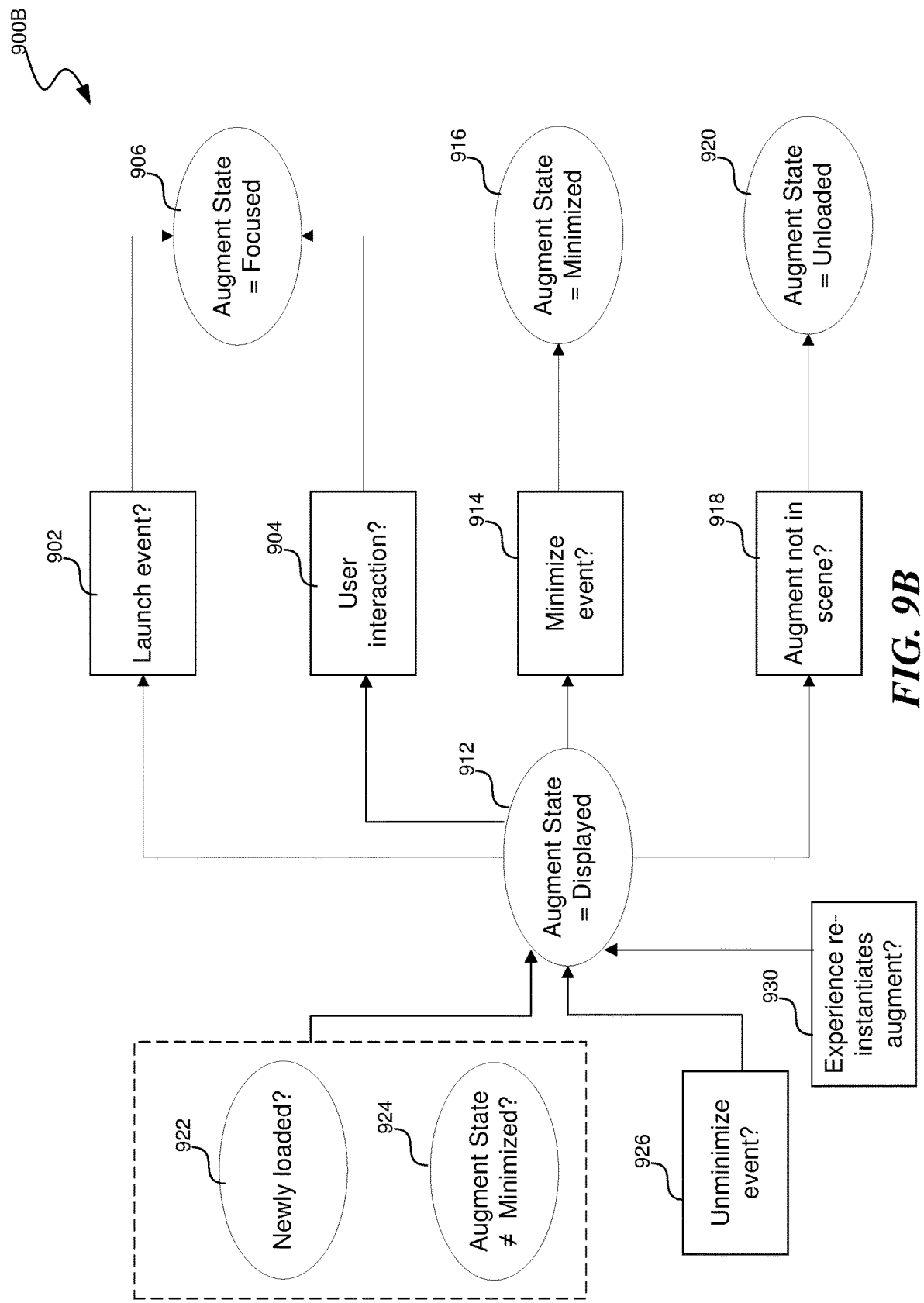
FIG. 9B is a flow diagram illustrating a process used in some implementations for entering and exiting a displayed augment state according to an augmented world environment model.

FIG. 9B is a flow diagram illustrating a process 900B used in some implementations for entering and exiting a displayed augment state according to an augmented world environment model. In some implementations, process 900B can be performed when it is determined that an augment does not have an augment state of unloaded at block 922 and does not have an augment state of minimized at block 924. In some implementations, process 900B can be performed when an augment has an unminimize event at block 926. In some implementations, process 900B can be performed when an XR experience re-instantiates an augment at block 930. In some implementations, one or more blocks of process 900B can be performed by an XR device, such as an XR head-mounted display (HMD) (e.g., XR HMD 200 of FIG. 2A and/or XR HMD 252 of FIG. 2B). In some implementations, one or more blocks of process 900B can be performed by another XR device in an XR system in operable communication with an XR HMD, such as external processing components.

At block 922, process 900B can determine whether an augment is newly loaded into the augmented world environment, and at block 924, process 900B can determine whether the newly loaded augment does not have a minimized state. If the augment is newly loaded and does not have the minimized state, process 900B can determine that the augment has a displayed state at block 912. Further details regarding loading an augment from an unloaded state are described with respect to FIG. 9D. Further details regarding a minimized state are described with respect to FIG. 9C.

Alternatively, at block 926, process 900B can determine whether an unminimize event occurred with respect to an augment having the minimized state. For example, a user of the XR device can select an option to unminimize an augment displayed as an icon on the XR device, which, in some implementations, can be overlaid onto a view of the real-world environment. If an unminimize event occurred, process 900B can cause the augment to transition to the displayed state at block 912. Further details regarding unminimizing an augment having a minimized state are described herein with respect to FIG. 9C.

Alternatively, at block 930, process 900B can determine whether an XR experience corresponding to an augment has re-instantiated the augment. For example, if an XR device can no longer localize the augment (e.g., due to the user of the XR device leaving the room, leaving a particular guardian, being a threshold distance from spatial anchors needed to localize the augment, etc., as described further herein), the XR device can enter an unloaded state, as described further herein with respect to FIG. 9D. However, if the XR device is able to re-localize the augment, the XR device can send an instantiation event to the XR experience corresponding to the augment, and, in some implementations, the XR experiences can re-instantiate the augment in a displayed augment state at block 912.

In the displayed augment state, the augment can be loaded in the scene and can render its content into a presenter volume, which may or may not be within the field-of-view of the XR device. In some implementations, the augment can be visible when looked at, and audible when behind the user of the XR device. The augment's corresponding spatial anchor can be localized, and the XR device can place the augment relative to the spatial anchor.

In some implementations, when an augment has a displayed state, the augment can have degradation applied relative to an augment in a focused state. In other words, in some implementations, the augment having the displayed state can be rendered in a fully or selectively moderated manner. The moderated manner can include at least one of dimming, desaturating, rendering the augment in two dimensions, reducing framerate/pausing animation, applying foveated vignette, monochrome rendering, removing fills, reducing texture resolution, using imposters, simplification of features (e.g., reducing polygon count, making an augment appear blockier), applying blur, entering light or dark mode, compressing content, degrading to bounding box, degrading to object outline, clipping the field-of-view, reducing dynamic lighting, applying smoothing (e.g., blue or shapes), applying noise (e.g., fine grain, coarse grain, etc.), or any combination thereof, thus requiring less resources to render the augment.

Foveated imaging is an image processing technique in which the amount of detail varies across the image based on the fixation point of a user's gaze. Vignette is an image processing technique in which an image fades off gradually into the background. Thus, "foveated vignette," as referred to herein, describes applying image processing to the augment such that the augment fades gradually from a focal point, such as a particular virtual object, toward its edges and into the background. In some implementations, by applying foveated rendering, the augment can have increased opacity or transparency toward its edges such that it appears to fade into the real-world background. In some implementations, the augment can become darker toward its edges, i.e., fading into black. By applying foveated vignette, less heat can be generated on the display of an XR system, and less processing power can be needed due to lack of detailed rendering of the entire augment.

An "imposter," as used herein, is a two-dimensional simplified rendering of a three-dimensional object mapped onto a rectangular card or billboard. To create an imposter, process 900B can render multiple possible perspectives of a three-dimensional representation of the augment into textures onto a billboard, creating a less complex geometric representation. Because the augment is not focused, the user of the XR device is less likely to notice the imposter. Using imposters can result in the XR device using less processing power by reducing the amount of geometry that needs to be rendered.

Entering light or dark mode, as used herein, relates generally to the inversion of colors. In dark mode, process 900B can render the augment in light color against a dark background. In contrast, in light mode, process 900B can render the augment in dark colors against a light background. Using light or dark mode can reduce power consumption by the display on an XR device depending on the environment of the user of the XR device. For example, if the user is in a room with high ambient light, process 900B can enter light mode and render the augment in darker colors, reducing battery consumption. As another example, if the user is in a room with low ambient light, process 900B can enter dark mode and render the background in darker colors, also reducing battery consumption.

The augment can exit a displayed augment state and enter another augment state by any of a variety of methods, such as those described with respect to blocks 902, 904, 914, and 918. At block 902, process 900B can determine whether a launch event occurred to bring the augment into a focused augment state. In this context, the launch event can be, for example, an XR experience selecting to bring the displayed augment into focus, and placing an augment previously in a focused augment state into a displayed, minimized, unloaded, or closed augment state, as described further herein with respect to FIGS. 9A and 9E. If process 900B determines that a launch event occurred at block 902, process 900B can bring the augment into a focused augment state at block 906.

At block 904, process 900B can determine whether there was a user interaction with an augment having the displayed augment state. If there was a user interaction with the augment having the displayed augment state, process 900B can bring the augment into a focused augment state at block 906. Further details regarding determining whether a user interaction with an augment occurred and further details regarding a focused augment state are described herein with respect to FIG. 9A.

At block 914, process 900B can determine whether a minimize event has occurred with respect to the augment in the displayed augment state. If process 900B determines that a minimize event has occurred at block 914, process 900B can change the augment state to a minimized augment state at block 916. In some implementations, the minimize event can be a user minimization of the augment to an icon in order to clear the user's field-of-view, or to create space in the augmented world environment. Further details regarding a minimized augment state are described herein with respect to FIG. 9C.

At block 918, process 900B can determine whether the augment is not in the scene. If process 900B determines that the augment is not in the scene at block 918, process 900B can change the augment state to an unloaded augment state at block 920. Once in an unloaded augment state, the corresponding XR experience will not be doing any work or consuming any resources for the augment. Further details regarding an unloaded augment state are described herein with respect to FIG. 9D.

Figure 9C:
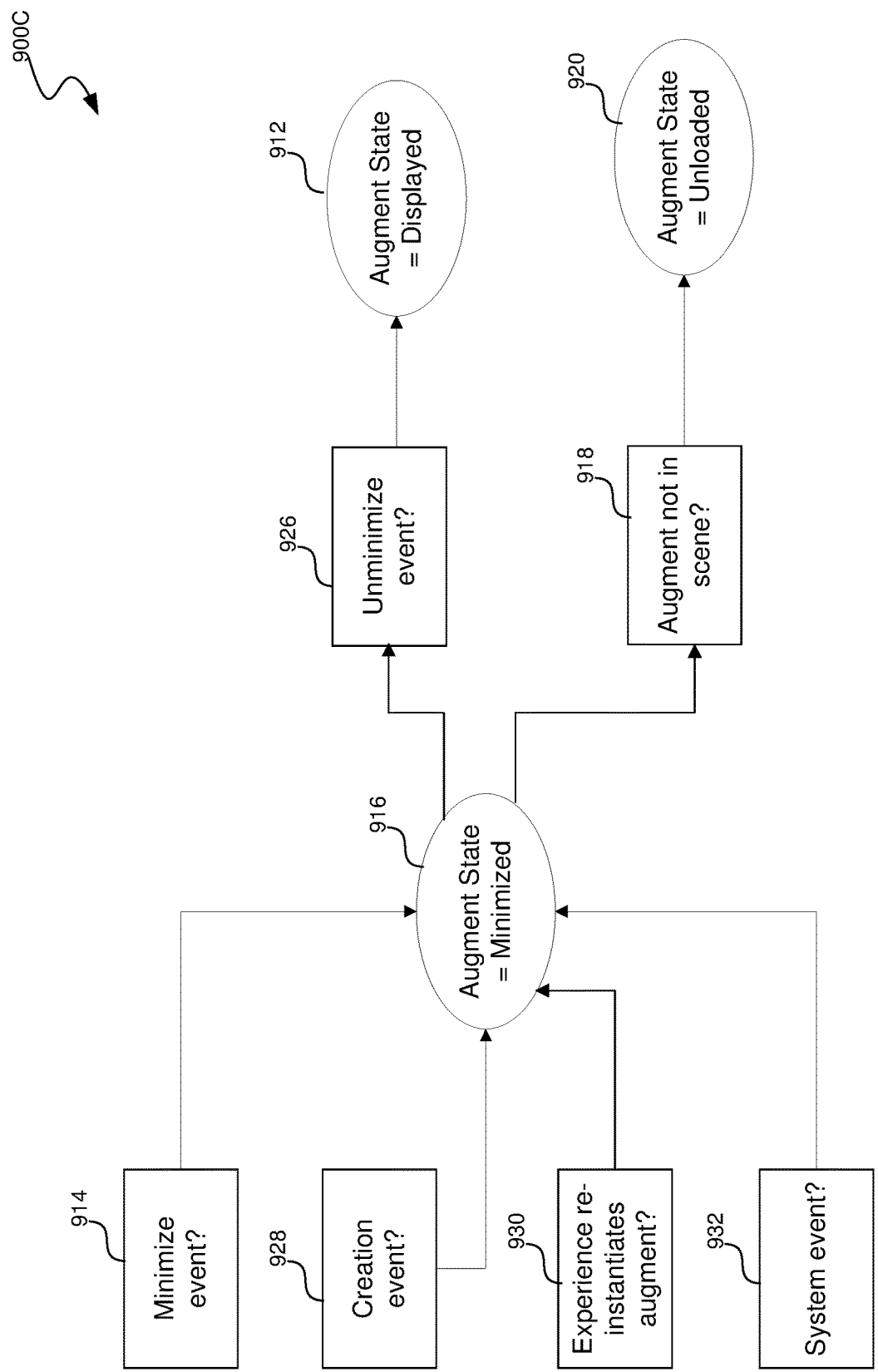
FIG. 9C is a flow diagram illustrating a process used in some implementations for entering and exiting a minimized augment state according to an augmented world environment model.

FIG. 9C is a flow diagram illustrating a process 9000 used in some implementations for entering and exiting a minimized augment state according to an augmented world environment model. In some implementations, process 9000 can be performed when it is determined that a minimize event has occurred at block 914, a creation event has occurred at block 928, an experience re-instantiates an augment at block 930, and/or a system event has occurred at block 932. In some implementations, one or more blocks of process 9000 can be performed by an XR device, such as an XR head-mounted display (HMD) (e.g., XR HMD 200 of FIG. 2A and/or XR HMD 252 of FIG. 2B). In some implementations, one or more blocks of process 9000 can be performed by another XR device in an XR system in operable communication with an XR HMD, such as external processing components.

At block 914, process 9000 can determine whether a minimize event has occurred with respect to an augment having a focused augment state or a displayed augment state. In some implementations, the minimize event can be a user minimization of the augment. For example, the user can select an option, such as a virtual button or other selectable element, displayed on the XR device in conjunction with the augment. In some implementations, the user can select the option by, for example, touching of or hovering over the virtual button with the user's virtual hand (which can be tracking movements of the user's physical hand), touching of or hovering over the virtual button with a virtual ray cast from the user's virtual hand and/or a controller (e.g., controller 276A and/or controller 276B of FIG. 2C), a selection of a physical button when the virtual ray cast from the controller is hovering over the virtual button, etc. In some implementations, the minimize event can alternatively or additionally include the user's gaze direction being away from a focused or displayed augment (e.g., for a threshold period of time), which, in some implementations, can be captured by one or more cameras integral with the XR device and facing the user. If process 900B determines that a minimize event has occurred at block 914, process 900B can cause the augment to transition to a minimized augment state at block 916.

At block 928, process 9000 can determine whether a creation event has occurred. The creation event can be, for example, an XR experience creating a new augment in the scene. In some implementations, when the XR experiences creates a new augment in the scene, that augment can have a focused augment state or a displayed augment state, and the pre-existing augment can be assigned a minimized augment state at block 916.

At block 930, process 9000 can determine whether an XR experience corresponding to the augment has re-instantiated the augment. For example, as described herein with respect to FIG. 9D, the XR device can no longer localize an augment in some circumstances, such as when a user of the XR device leaves the room in which the augment is rendered. When the user re-enters the room, for example, process 9000 can re-localize the augment and send an instantiation event to the corresponding XR experience. The XR experience can then re-instantiate the augment, putting the augment into a minimized augment state at block 916. In some implementations, however, it is contemplated that the XR experience can alternatively re-instantiate the augment in a displayed augment state at block 912 of FIG. 9B.

In some implementations, the XR experience can determine whether to re-instantiate the augment into a displayed augment state at block 912 of FIG. 9B, or in a minimized augment state at block 916 of FIG. 9C. In some implementations, however, process 9000 can determine whether to re-instantiate the augment into a displayed augment state at block 912 of FIG. 9B, or in a minimized augment state at block 916 of FIG. 9C. Process 9000 can make such a determination, based on, for example, system-level or application-defined constraints, such as available resources (e.g., battery power, processing power, available storage, etc.), a size of the augment, a size of the augment that is allocated to a particular content item, the size of the augment that is allocated to the XR experience relative to the size of augments allocated to the one or more other XR experiences, how the content items and/or augments associated with the same or different XR experiences can interact with each other, how the content items and/or augments are positioned with respect to other content items and/or augments associated with the same or different XR experiences, crowding of the field-of-view of the user on the XR device, or any combination thereof.

At block 932, process 9000 can determine whether a system event has occurred. In some implementations, the system event can be enforced minimization of an augment by an XR device. In some implementations, the XR device can enforce minimization based on any of the system-level or application-defined constraints described above. If process 9000 determines that a system event has occurred, process 9000 can cause the augment to transition to a minimized augment state at block 916.

In the minimized augment state, the augment can be loaded in the scene (and may be in or out of the user's field-of-view on the XR device), but the augment can be minimized to an icon. The icon can be a simplification of the augment, and can include text and/or graphics representative of the augment. For example, if the augment is an XR chess board, the icon can be a chess piece. In some implementations, the icon can be simplified to two dimensions and/or can be static. In some implementations, however, the icon can be three-dimensional (3D) and/or dynamic. In some implementations, the icon can be a placeholder for the augment that is visible when looked at. In some implementations, the icon's related spatial anchor can be localized and the XR device can render the icon at that spatial anchor.

In some implementations, the minimized augment state can be useful for a user so that she is able to clear her field-of-view without unloading or closing the augment. For example, the minimized augment state allows the user to minimize the amount of display dedicated to the augment, without removing reference to the augment from the scene altogether, allowing the user to quickly and easily unminimize the augment as desired. In some implementations, the minimized augment state can be useful to create space in the augmented world environment, which can cause an augment to be minimized to avoid collision of augments.

The augment can exit the minimized augment state and enter another augment state by any of a variety of methods. For example, at block 926, process 9000 can determine whether an unminimize event has occurred. Similar to a minimize event at block 914, an unminimize event can include a user selection of an option to unminimize the augment (e.g., through a hand gesture, via a controller, via a voice command, through a gaze dwell for a threshold period of time, etc.). In some implementations, the unminimize event can be system-initiated, such as when the XR device has sufficient processing power, display area, battery power, storage, etc. to unminimize the augment. If process 9000 detects an unminimize event at block 926, process 9000 can cause the augment to transition to a displayed augment state at block 912. Further details regarding a displayed augment state are described herein with respect to FIG. 9B.

At block 918, process 9000 can determine whether the augment is not in the scene. If process 900B determines that the augment is not in the scene at block 918, process 900B can change the augment state to an unloaded augment state at block 920. Once in an unloaded augment state, the corresponding XR experience will not be doing any work or consuming any resources for the augment. Further details regarding an unloaded augment state are described herein with respect to FIG. 9D.

Figure 9D:
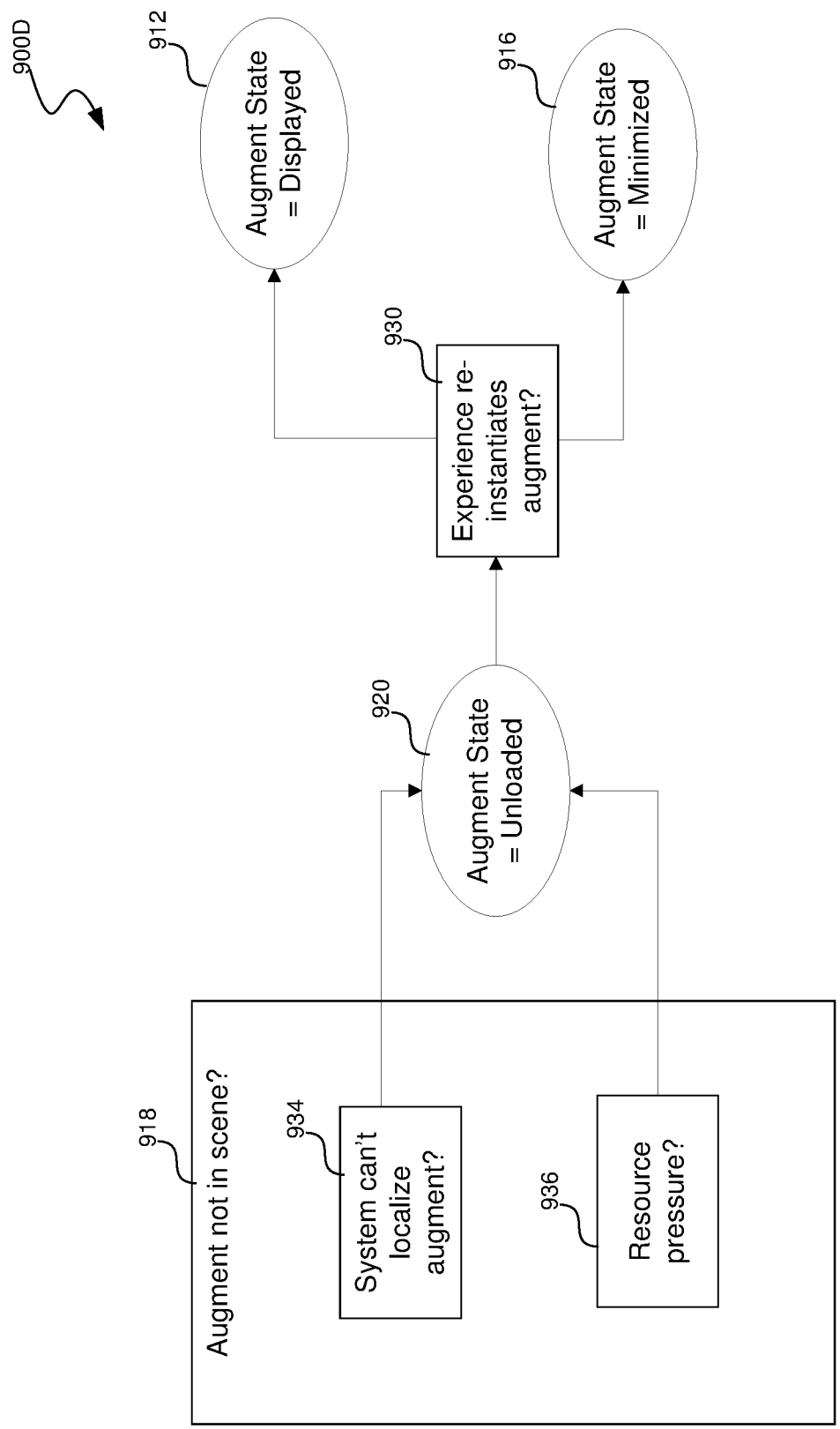
FIG. 9D is a flow diagram illustrating a process used in some implementations for entering and exiting an unloaded augment state according to an augmented world environment model.

FIG. 9D is a flow diagram illustrating a process 900D used in some implementations for entering and exiting an unloaded augment state according to an augmented world environment model. In some implementations, process 900D can be performed when it is determined that the augment is not in the scene at block 918. In some implementations, one or more blocks of process 900D can be performed by an XR device, such as an XR head-mounted display (HMD) (e.g., XR HMD 200 of FIG. 2A and/or XR HMD 252 of FIG. 2B). In some implementations, one or more blocks of process 900D can be performed by another XR device in an XR system in operable communication with an XR HMD, such as external processing components.

At block 918, process 900D can determine whether an augment is not in the scene. In some implementations, process 900D can determine that the augment is not in the scene because process 900D determines, at block 934, that the system cannot localize the augment. In some implementations, the XR device being a threshold distance away from an augment can cause the augment to no longer be localized, e.g., due to the user leaving a physical space (e.g., a room) in which the augment is localized. In some implementations, process 900D can determine that the system can no longer localize the augment because the XR device moved outside a guardian where the XR experience and/or the augment can be accessed. In some implementations, the process 900D can determine that the system can no longer localize the augment because the XR device no longer has access to one or more spatial anchors referenced by the augment, and needed to render the augment. If process 900D determines that the system cannot localize the augment at block 934, process 900D can cause the augment to transition to unloaded augment state at block 920.

In some implementations, process 900D can determine that the augment is not in the scene because process 900D determines, at block 936, that there is resource pressure. For example, process 900D can determine that there is insufficient processing power, memory capabilities, storage, battery power, display resources, etc., to render an augment in a focused augment state, displayed augment state, or minimized augment state. Thus, process 900D can cause the augment to be in an unloaded augment state at block 920.

In the unloaded augment state, the augment is not in the scene. The XR experience corresponding to the augment in the unloaded augment state should not be doing any work or consuming any resources for the augment in the unloaded augment state. If the augment is persisted, it can still appear in an augment or experience manager, and can appear open to the user, as described herein with respect to FIG. 8.

Figure 9E:
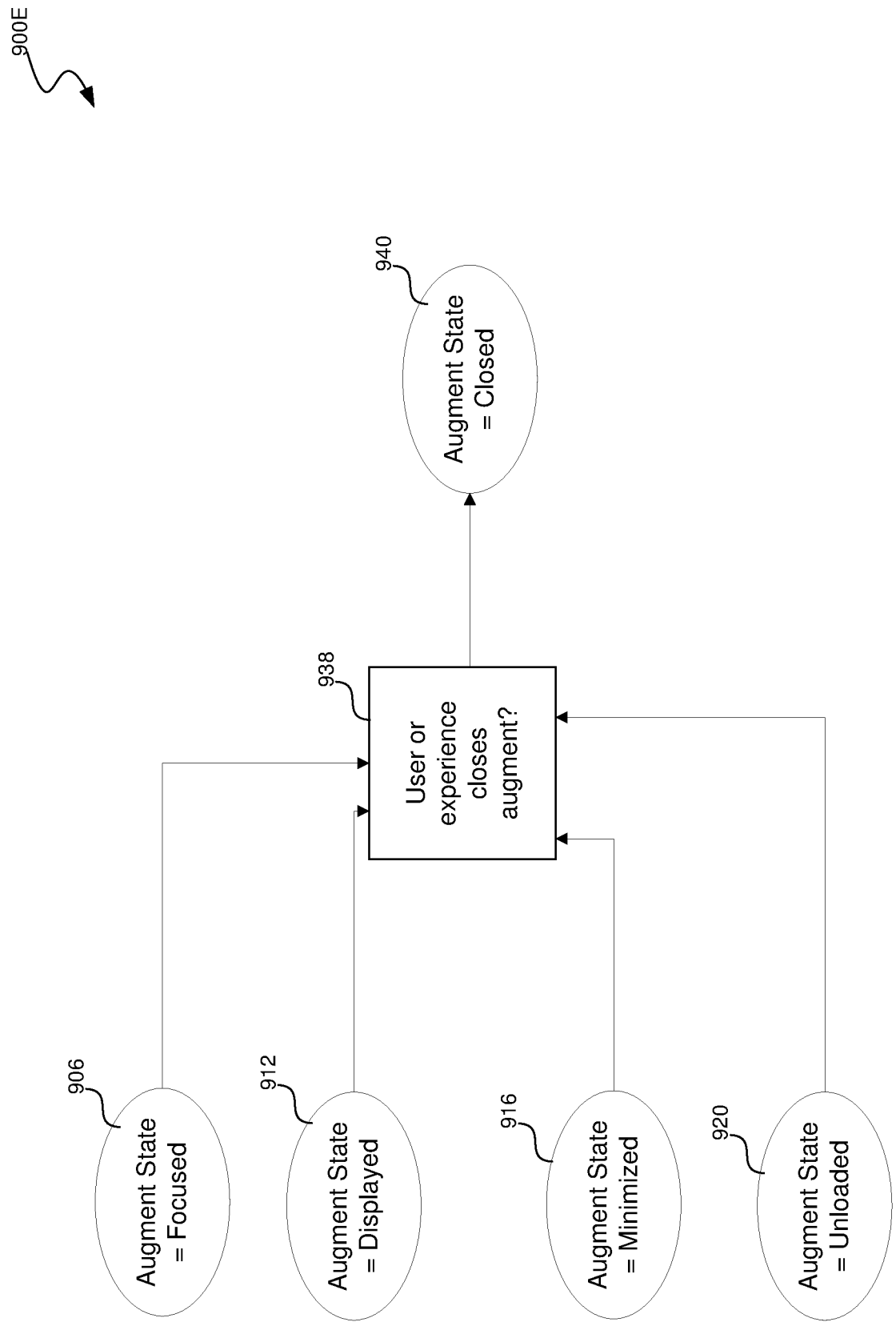
FIG. 9E is a flow diagram illustrating a process used in some implementations for entering and exiting a closed augment state according to an augmented world environment model.

FIG. 9E is a flow diagram illustrating a process 900E used in some implementations for entering and exiting a closed augment state according to an augmented world environment model. In some implementations, process 900E can be performed when a user or XR experience closes a corresponding augment. In some implementations, one or more blocks of process 900E can be performed by an XR device, such as an XR head-mounted display (HMD) (e.g., XR HMD 200 of FIG. 2A and/or XR HMD 252 of FIG. 2B). In some implementations, one or more blocks of process 900D can be performed by another XR device in an XR system in operable communication with an XR HMD, such as external processing components.

In some implementations, from an augment having a focused augment state at block 906, an augment having a displayed augment state at block 912, an augment having a minimized augment state at block 916, or an augment having an unloaded augment state at block 920, process 900E can determine whether a user or an XR experience closes the augment at block 938. In some implementations, process 900E can determine that a user closed an augment based on, for example, a user selection of an option to close the augment from an experience/augment manager (e.g., a list of open augments and/or experiences), and can cause the augment to transition to the closed augment state at block 940. In some implementations, process 900E can determine that an XR experience in an active experience state has chosen to close one of its corresponding augments, and can cause the augment to transition to the closed augment state at block 940. In some implementations, process 900E can determine that an orchestrating experience (e.g., an experience managing rendering of augments corresponding to one or more open XR experiences) has closed the augment, and can cause the augment to transition to the closed augment state at block 940. In some implementations, the XR experience and/or the orchestrating experience can close an augment based on one or more constraints, the constraints being either system-level (i.e., established by a platform associated with the XR device) or developer-defined (i.e., established by a developer of a respective XR experience and/or its particular rendering framework. For example, the constraints can include one or more of a size of the augment, a size of the augment that is allocated to a particular content item, the size of the augment that is allocated to the XR experience relative to the size of augments allocated to the one or more other XR experiences, how the content items and/or augments associated with the same or different XR experiences can interact with each other, how the content items and/or augments are positioned with respect to other content items and/or augments associated with the same or different XR experiences, or any combination thereof. In the closed augment state, the augment no longer exists (i.e., it is deleted from the augment graph for the scene).

Table I below summarizes experience states when an XR experience has at least one augment in a respective augment state:

focused augment state based upon a launch of the XR weather experience. In some implementations, augment 1004 can be in a focused augment state based on a user interaction with augment 1004, such as touching or hovering with a virtual hand (tracking the user's physical hand), touching or hovering with a virtual ray cast from the virtual hand or a controller and overlaid onto real-world environment 1002, and/or gaze of the user of the XR device dwelling on augment 1004 (i.e., looking at augment 1004 for greater than a threshold amount of time). In some implementations, augment 1004 can be the only augment of augments 1004-1008 that can have the focused augment state. In some implementations, augment 1004 can remain in the focused augment state as long as interaction continues to occur, e.g., the user of the XR device continues to gaze at augment 1004. In some implementations, augment 1004 can remain in the focused augment state indefinitely, unless or until another augment enters the focused augment state (e.g., augment 1006), or unless or until the augment is closed.

While augment 1004 has the focused augment state, the XR weather experience can have an active experience state. While in the active experience state, the XR weather experience can close augments, create augments, manipulate augments, and move augments from body-leashed to world-locked. In some implementations, such capabilities are not available to an XR checkers experience corresponding to augment 1006, or an XR movie experience corresponding to augment 1008, as they are not and cannot be in the active experience state.

In exemplary view 1000A, augment 1006, corresponding to the XR checkers experience, can be in a displayed augment state. In some implementations, because augment 1006 is in the displayed augment state, augment 1006 can be rendered in a moderated manner (i.e., with degradation)

|  | User Perceived | Augment States | | | | Experience State | Variables Working |
|---|---|---|---|---|---|---|---|
|  |  | Variables of Definition | | | |  |  |
|  |  | System | Focused | Displayed | Loaded | System |  |
| 1 | Open/Focused | Focused | Focused | Displayed | Loaded | Active | Working |
| 2 | Open | Displayed | Unfocused | Displayed | Loaded | Foregrounded | Working |
| 3 | Open | Minimized | Unfocused | Minimized | Loaded | Backgrounded | Working |
| 4 | Open | Unloaded | Unfocused | Not Displayed | Unloaded | Backgrounded | Working |
| 5 | Open | Unloaded | Unfocused | Not Displayed | Unloaded | Not Running | Not Working |
| 6 | Closed | Closed | n/a | n/a | n/a | Closed | n/a |

As shown in Table I, in some implementations, the backgrounded experience state has one state while its corresponding augment states have their own respective states (i.e., in lines 3 and 4). In both cases, the XR experience is not displaying augments to the user via the XR device. In one example, the implementation of line 3 supports minimization, instantiating into the scene, and degradation. In another example, the implementation of line 4 supports persistent audio, where augments are not necessary for the XR experience.

FIG. 10A is a conceptual diagram illustrating an exemplary view 1000A from an XR device of augments 1004-1008, having various augment states, overlaid on a view of a real-world environment 1002 surrounding the XR device. In exemplary view 1000A, augment 1004, corresponding to an XR weather experience, can be in a focused augment state. In some implementations, augment 1004 can be in a relative to augment 1004 in the focused augment state. The moderated manner can include at least one of dimming, desaturating, rendering the augment in two dimensions, reducing framerate/pausing animation, applying foveated vignette, monochrome rendering, removing fills, reducing texture resolution, using imposters, simplification of features (e.g., reducing polygon count, making an augment appear blockier), applying blur, entering light or dark mode, compressing content, degrading to bounding box, degrading to object outline, clipping the field-of-view, reducing dynamic lighting, applying smoothing (e.g., blue or shapes), applying noise (e.g., fine grain, coarse grain, etc.), or any combination thereof, thus requiring less resources to render augment 1006 than augment 1004. In exemplary view 1000A, the dashed lines outlining augment 1006 indicate that augment 1006 is being rendered in a moderated manner.

Further in exemplary view 1000A, augment 1008, corresponding to an XR movie experience, can be in a minimized augment state. For example, augment 1008 can be an icon representative of the XR movie experience, e.g., a director's cut board. If the user of the XR device unminimizes augment 1008, augment 1008 can have a displayed augment state, similar to augment 1006. If resource pressure becomes too high to render augment 1008, for example, augment 1008 can have an unloaded augment state, and augment 1008 can be removed from exemplary view 1000A.

In some implementations, augment 1004 and augment 1008 communicate with each other. In particular, experiences managing augments can declare particular content types, such as user input text or data processed by the experience, to be accessible by other experiences. The content types can be declared in the manifest described above. By way of illustration, upon a drag from a user from augment 1004 to augment 1008, a snapshot of weather data can be shared to the experience managing augment 1008. The weather data can be used to customize the augment 1008.

FIG. 10B is a conceptual diagram illustrating an exemplary view 1000B from an XR device of an option 1010 to enter an exclusive mode, with respect to an XR experience, overlaid on a view of a real-world environment 1002 surrounding the XR device. In some implementations, option 1010 to enter an exclusive mode with respect to the XR weather experience can be rendered automatically when augment 1004 is in a focused augment state. In some implementations, option 1010 to enter an exclusive mode with respect to the XR weather experience can be rendered upon hovering and/or interaction of virtual ray 1012 with augment 1004. In some implementations, however, it is contemplated that option 1010 can be omitted from exemplary view 1000B, and that the user of the XR device can instead audibly announce that he wishes to enter exclusive mode with respect to the XR weather experience.

Figure 10C:
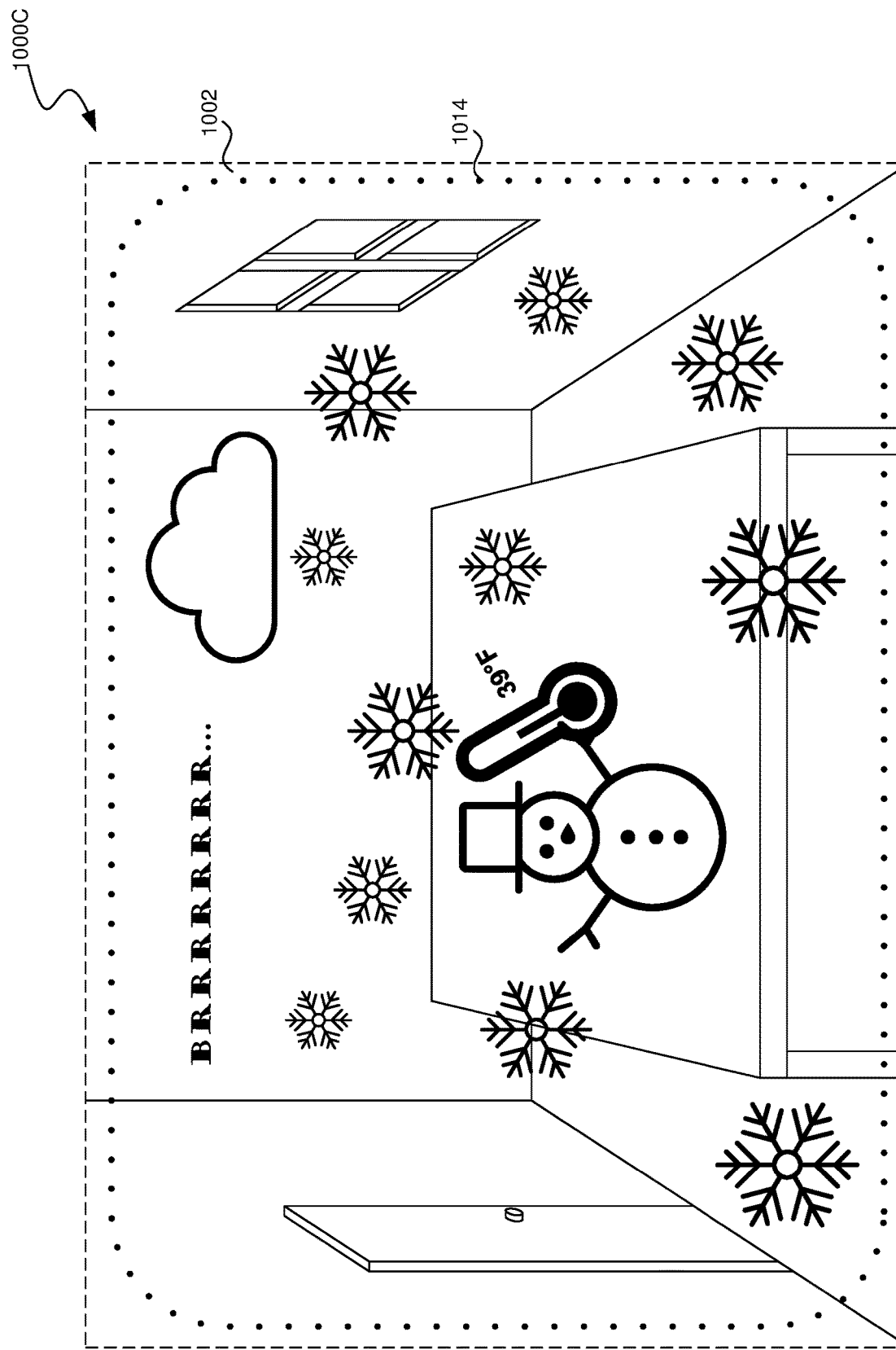
FIG. 10C is a conceptual diagram illustrating an exemplary view from an artificial reality device of an artificial reality experience, in exclusive mode, overlaid on a view of a real-world environment surrounding the artificial reality device.

FIG. 10C is a conceptual diagram illustrating an exemplary view 1000C from an XR device of an XR experience, in exclusive mode, overlaid on a view of a real-world environment 1002 surrounding the XR device. From view 10001B of FIG. 10B, the user of the XR device can use virtual ray 1012, cast from a controller, to point at option 1010 to enter the exclusive mode, and select the option by, for example, selecting a physical button on the controller while pointing at option 1010. Upon selection of option 1010, the XR weather experience can enter the exclusive mode. While in the exclusive mode, exemplary view 1000C can no longer display augments 1006-1008 and their corresponding XR applications, and allow the XR weather experience to fully control exemplary view 1000C. In exemplary view 1000C, the XR weather experience can exclusively render augments and content items 1014 overlaid on the view of real-world environment 1002.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing an augmented world environment model for an artificial reality environment, the method comprising:
    managing the artificial reality environment on an artificial reality device, the artificial reality environment including multiple artificial reality experiences, each artificial reality experience providing one or more corresponding augments, the augments defining bounding layouts for one or more content items; and
    rendering the artificial reality environment based on a defined hierarchy of multiple states,
        wherein the defined hierarchy is based on a set of rules that control rendering of the multiple artificial reality experiences and the corresponding augments, wherein each artificial reality experience, of the multiple artificial reality experiences, has an experience state, of the multiple states, the experience states comprising an active state, a foregrounded state, a backgrounded state, a not running state, and a closed experience state, wherein each augment of the one or more corresponding augments has an augment state of the multiple states, the augment states comprising a focused state, a displayed state, a minimized state, an unloaded state, and a closed augment state, and wherein an augment of the one or more augments, corresponding to a particular artificial reality experience of the multiple artificial reality experiences, having the focused state as the augment state, causes the experience state for the particular artificial reality experience to transition to the active state, based on a rule of the set of rules.

2. The method of claim 1, wherein interaction, by a user of the artificial reality device, with the augment of the one or more augments corresponding to the particular artificial reality experience, causes the augment to transition to the focused state as the augment state.

3. The method of claim 1,
wherein the particular artificial reality experience, of the multiple artificial reality experiences, is a first artificial reality experience, and the rule is a first rule of the set of rules, and
wherein a second artificial reality experience, of the multiple artificial reality experiences, not being in the active state, and having at least one of the one or more augments, corresponding to the second artificial reality experience, in the displayed state, causes a corresponding transition to the foregrounded state for the second artificial reality experience.

4. The method of claim 1, wherein the particular artificial reality experience, of the multiple artificial reality experiences, is exclusively in the active state.

5. The method of claim 1,
wherein the particular artificial reality experience, of the multiple artificial reality experiences, is a first artificial reality experience, and the rule is a first rule of the set of rules, and
wherein a second artificial reality experience creating a new augment in the artificial reality environment causes an augment, of the one or more augments corresponding to the second artificial reality experience, to transition to the minimized state.

6. The method of claim 1, wherein the artificial reality device renders an augment, of the one or more corresponding augments, in the displayed state with degradation relative to the augment having the focused state.

7. The method of claim 1, wherein a virtual representation of the artificial reality device being a threshold distance away from an augment of the one or more corresponding augments causes the augment to transition to the unloaded state.

8. The method of claim 1,
wherein the particular artificial reality experience, of the multiple artificial reality experiences, is a first artificial reality experience, and the rule is a first rule of the set of rules, and
wherein each of the one or more augments, corresponding to a second artificial reality experience of the multiple artificial reality experiences, having at least one of A) the minimized state, B) the unloaded state, C) the closed augment state, or D) any combination thereof, causes the second artificial reality experience to transition to the backgrounded state, based on a second rule of the set of rules.

9. The method of claim 1,
wherein the particular artificial reality experience, of the multiple artificial reality experiences, is a first artificial reality experience, and the rule is a first rule of the set of rules, and
wherein the artificial reality device terminating a second artificial reality experience of the multiple artificial reality experiences causes the second artificial reality experience to transition to the not running state, based on a second rule of the set of rules.

10. The method of claim 1,
wherein the particular artificial reality experience, of the multiple artificial reality experiences, is a first artificial reality experience, and the rule is a first rule of the set of rules, and
wherein either A) a second artificial reality experience, of the multiple artificial reality experiences, being closed by a user of the artificial reality device, or B) each of the one or more augments, corresponding to the second artificial reality experience, being closed by a user of the artificial reality device, causes the second artificial reality experience to transition to the closed experience state, based on a second rule of the set of rules.

11. The method of claim 1, further comprising:
receiving input relative to the augment corresponding to the particular artificial reality experience to enter an exclusive mode for the particular artificial reality experience; and
exclusively rendering the particular artificial reality experience in the artificial reality environment.

12. A non-transitory computer-readable storage medium storing instructions that, when executed by a computing system, cause the computing system to perform a process for providing an augmented world environment model for an artificial reality environment, the process comprising:
managing multiple artificial reality experiences in the artificial reality environment on an artificial reality device, each artificial reality experience providing one or more corresponding augments defining bounding layouts for one or more content items; and
rendering the artificial reality environment based on a hierarchy of multiple states,
wherein each artificial reality experience has an experience state, of the multiple states, the experience states defining capabilities of respective artificial reality experiences within the artificial reality environment;
wherein each augment of the one or more corresponding augments has an augment state, of the multiple states, the augment states defining how respective augments are or are not displayed in the artificial reality environment,
wherein at least one of the multiple states is selected based on a mapping between at least one of the experience states and at least one of the augment states defined by the hierarchy; and
wherein each of the one or more augments, corresponding to a particular artificial reality experience of the multiple artificial reality experiences, having a not displayed state, causes the particular artificial reality experience to transition to a backgrounded state, based on a set of rules.

13. The non-transitory computer-readable storage medium of claim 12,
wherein the experience states comprise an active state, a foregrounded state, the backgrounded state, a not running state, and a closed experience state, and
wherein the augment states comprise a focused state, a displayed state, and the not displayed state.

14. The non-transitory computer-readable storage medium of claim 13, wherein the not displayed state is a minimized state, an unloaded state, or a closed augment state.

15. A computing system for providing an augmented world environment model for an artificial reality environment, the computing system comprising:
one or more processors; and
one or more memories storing instructions that, when executed by the one or more processors, cause the computing system to perform a process comprising:
managing multiple artificial reality experiences in the artificial reality environment on an artificial reality device, each artificial reality experience providing one or more corresponding augments defining bounding layouts for one or more content items; and
rendering the artificial reality environment based on a hierarchy of multiple states,
wherein each artificial reality experience has an experience state, of the multiple states, the experience states defining capabilities of respective artificial reality experience in the artificial reality environment,
wherein each augment of the one or more corresponding augments has an augment state, of the multiple states, the augment states defining how respective augments are or are not displayed in the artificial reality environment,
wherein at least one of the multiple states is selected based on a mapping between at least one of the experience states and at least one of the augment states defined by the hierarchy, and
wherein an augment of the one or more augments, corresponding to a particular artificial reality experience of the multiple artificial reality experiences, having a focused state as the augment state, causes an active state as the experience state for the particular artificial reality experience, based on the hierarchy.

16. The computing system of claim 15,
wherein the experience states comprise the active state, a foregrounded state, a backgrounded state, a not running state, and a closed experience state, and
wherein the augment states comprise the focused state, a displayed state, and a not displayed state.

17. The computing system of claim 16, wherein interaction, by a user of the artificial reality device, with an augment of the one or more augments corresponding to a particular artificial reality experience of the multiple artificial reality experiences, causes the augment to transition to the focused state as the augment state.

18. The computing system of claim 17, wherein the artificial reality device renders an augment, of the one or more corresponding augments, in the displayed state with degradation relative to the augment having the focused state.

* * * * *